(12) United States Patent
Machita et al.

(10) Patent No.: US 7,583,478 B2
(45) Date of Patent: Sep. 1, 2009

(54) THIN-FILM MAGNETIC HEAD, HEAD GIMBAL ASSEMBLY, HEAD ARM ASSEMBLY AND MAGNETIC DISK DRIVE

(75) Inventors: Takahiko Machita, Tokyo (JP); Kei Hirata, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 658 days.

(21) Appl. No.: 11/482,090

(22) Filed: Jul. 7, 2006

(65) Prior Publication Data
US 2007/0109691 A1    May 17, 2007

(30) Foreign Application Priority Data
Nov. 15, 2005    (JP)    ............... 2005-329934

(51) Int. Cl.
*G11B 5/33* (2006.01)

(52) U.S. Cl. ..................................... 360/319
(58) Field of Classification Search ................. 360/319
See application file for complete search history.

(56) References Cited

U.S. PATENT DOCUMENTS

| | | | |
|---|---|---|---|
| 6,025,977 A * | 2/2000 | Hu et al. ................. | 360/319 |
| 6,452,756 B1 * | 9/2002 | Sasaki ...................... | 360/317 |
| 2002/0126423 A1 * | 9/2002 | Terunuma et al. ........... | 360/319 |
| 2003/0128478 A1 * | 7/2003 | Gill et al. ................... | 360/313 |
| 2004/0004787 A1 | 1/2004 | Matono et al. | |
| 2006/0067006 A1 * | 3/2006 | Takagishi et al. ........... | 360/319 |
| 2006/0203395 A1 * | 9/2006 | Guan et al. ................. | 360/319 |
| 2006/0209469 A1 * | 9/2006 | Akimoto ..................... | 360/319 |
| 2006/0245113 A1 * | 11/2006 | Guan et al. ................. | 360/319 |

FOREIGN PATENT DOCUMENTS

JP    A 2004-039148    2/2004

* cited by examiner

*Primary Examiner*—Angel A. Castro
(74) *Attorney, Agent, or Firm*—Oliff & Berridge, PLC

(57) ABSTRACT

A thin-film magnetic head comprises: a magnetoresistive element: first and second read shield layers disposed to sandwich the magnetoresistive element; and bias field applying layers for applying a bias magnetic field to the magnetoresistive element. Each of the first and second read shield layers has: a first end face located in a medium facing surface; a second end face opposite to the first end face; a first width changing portion that continuously decreases in width as the distance from the first end face decreases; and a second width changing portion that continuously decreases in width as the distance from the second end face decreases.

20 Claims, 21 Drawing Sheets

THIN-FILM MAGNETIC HEAD, HEAD GIMBAL ASSEMBLY, HEAD ARM ASSEMBLY AND MAGNETIC DISK DRIVE

BACKGROUND OF THE INVENTION

1. Field of the Invention

The present invention relates to a thin-film magnetic head for a perpendicular magnetic recording system, the thin-film magnetic head comprising a read head, and to a head gimbal assembly, a head arm assembly, and a magnetic disk drive each of which incorporates the thin-film magnetic head.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

The recording systems of magnetic disk drives include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements.

A typical spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

A read head comprises a pair of bias field applying layers disposed on both sides of the GMR element that are opposed to each other in the direction of track width. The bias field applying layers are provided for applying a bias magnetic field to the free layer. The bias magnetic field directs the magnetization in the free layer to the direction of track width while no signal magnetic field sent from the recording medium is applied to the free layer. The magnetization in the pinned layer is fixed to the direction orthogonal to a medium facing surface of the head that faces toward the recording medium. Consequently, an angle of 90 degrees is maintained between the direction of magnetization in the pinned layer and the direction of magnetization in the free layer while no signal field sent from the recording medium is applied to the free layer. If a signal field in the direction orthogonal to the medium facing surface is sent from the recording medium and applied to the read head, the direction of magnetization in the free layer is changed, and the angle between the direction of magnetization in the pinned layer and the direction of magnetization in the free layer is thereby changed. The electrical resistance of the GMR element is changed by this angle. Therefore, it is possible to read data stored on the medium by detecting the change in electrical resistance of the GMR element.

The read head further comprises a pair of read shield layers disposed to sandwich the GMR element. The read shield layers are provided for preventing the GMR element from being influenced by a magnetic field from bits that are not opposed thereto.

It is known that there are types of write heads for the perpendicular magnetic recording system one of which is a single-pole head and another one of which is a shield-type head. The single-pole head comprises: a medium facing surface that faces toward a recording medium; a coil for generating a magnetic field corresponding to data to be written on the recording medium; a pole layer (main pole) having an end face located in the medium facing surface, allowing a magnetic flux corresponding to the field generated by the coil to pass therethrough, and generating a write magnetic field for writing the data on the recording medium by means of the perpendicular magnetic recording system; an auxiliary pole having an end face located in the medium facing surface and having a portion that is located away from the medium facing surface and coupled to the pole layer; and a gap layer made of a nonmagnetic material and provided between the pole layer and the auxiliary pole. In the medium facing surface the end face of the auxiliary pole is located backward of the end face of the pole layer along the direction of travel of the recording medium. The auxiliary pole has a function of returning a magnetic flux that has been generated from the end face of the pole layer and has magnetized the recording medium.

The shield-type head comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of the perpendicular magnetic recording system; a write shield layer having an end face located in the medium facing surface and having a portion that is located away from the medium facing surface and coupled to the pole layer; and a gap layer made of a nonmagnetic material and provided between the pole layer and the write shield layer. In the medium facing surface the end face of the write shield layer is located forward of the end face of the pole layer along the direction of travel of the recording medium with a specific small space created by the thickness of the gap layer. In the shield-type head the write shield layer is capable of making the magnetic field gradient abrupt by taking in the magnetic flux generated from the pole layer. As a result, the shield-type head is capable of further improving the linear recording density. The magnetic field gradient means an amount of change of components orthogonal to the surface of the recording medium among components of the magnetic field generated from the pole layer, the amount of change being taken per unit length along the direction of travel of the recording medium. The write shield layer also has a function of returning a magnetic flux that has been generated from the end face of the pole layer and has magnetized the recording medium.

In a thin-film magnetic head for perpendicular magnetic recording, there sometimes occurs a phenomenon in which signals stored on tracks other than a track that is a target of writing or reading attenuate, resulting from the read shield layer or the write shield layer (the phenomenon will be hereinafter called track erase). It is assumed that the reason for track erase is that, in the read shield layer or the write shield layer, magnetic field components in the direction orthogonal to the medium facing surface increase locally in a neighborhood of two corner portions formed by the end face located in the medium facing surface and the respective side portions opposed to each other in the direction of track width. To secure the reliability of the thin-film magnetic head, it is required to suppress an occurrence of track erase.

Japanese Published Patent Application 2004-39148 discloses a technique for suppressing an occurrence of track erase wherein the read shield layer or the write shield layer is made to include a width changing portion that continuously decreases in width as the distance from the end face located in the medium facing surface decreases.

In the thin-film magnetic head, it is required to magnetize the bias field applying layers such that the magnetization thereof is directed to the direction of track width. This magnetizing of the bias field applying layers is performed by applying a magnetic field in the direction of track width to the thin-film magnetic head. This magnetizing is done during manufacture of the thin-film magnetic head or at the time of shipment.

The magnetizing of the bias field applying layers is performed on a plurality of occasions in some cases, such as both during manufacture of thin-film magnetic heads and at the time of shipment. Here, it has been found that, in the thin-film magnetic head comprising the read shield layer or the write shield layer including the width changing portion as mentioned above, there sometimes occurs a phenomenon in which the output of the read head varies every time the bias field applying layers are magnetized. This phenomenon does not occur if the plane geometry of the read shield layer or the write shield layer is a rectangle. To secure the reliability of the thin-film magnetic head, it is required to suppress output variations of the read head due to the magnetizing of the bias field applying layers.

In the thin-film magnetic head for perpendicular magnetic recording, there noticeably occurs a phenomenon in some cases in which signals stored on one or more tracks adjacent to a track that is the target of writing or reading attenuate (the phenomenon will be hereinafter called wide-range adjacent track erase). It is assumed that the wide-range adjacent track erase results from the instability of the magnetic state of the write shield layer. That is, in the medium facing surface, the end face of the write shield layer is located forward of the end face of the pole layer in the direction of travel of the recording medium with a specific small space created by the thickness of the gap layer. The width of the end face of the write shield layer is greater than the width of the end face of the pole layer. Therefore, it is assumed that, if the magnetic state of the write shield layer is unstable, the magnetic flux passing through the end face of the write shield layer changes, and the wide-range adjacent track erase thereby occurs. To achieve higher recording density and to secure the reliability of the thin-film magnetic head, it is also required to suppress an occurrence of the wide-range adjacent track erase.

OBJECTS AND SUMMARY OF THE INVENTION

It is a first object of the invention to provide a thin-film magnetic head for perpendicular magnetic recording that comprises a read head, the thin-film magnetic head being capable of suppressing an occurrence of track erase and output variations of the read head resulting from the magnetizing of bias field applying layers, and to provide a head gimbal assembly, a head arm assembly, and a magnetic disk drive each of which incorporates the thin-film magnetic head.

It is a second object of the invention to provide a thin-film magnetic head for perpendicular magnetic recording that comprises a read head and a write head, the thin-film magnetic head being capable of suppressing an occurrence of track erase, output variations of the read head resulting from the magnetizing of bias field applying layers, and an occurrence of wide-range adjacent track erase, and to provide a head gimbal assembly, a head arm assembly, and a magnetic disk drive each of which incorporates the thin-film magnetic head.

A first thin-film magnetic head of the invention comprises: a medium facing surface that faces toward a recording medium; a magnetoresistive element disposed near the medium facing surface and having a first surface and a second surface that face toward opposite directions and that intersect the medium facing surface, the magnetoresistive element reading data stored on the recording medium by means of a perpendicular magnetic recording system; a first read shield layer disposed to face toward the first surface of the magnetoresistive element; a second read shield layer disposed to face toward the second surface of the magnetoresistive element; and bias field applying layers for applying a bias magnetic field to the magnetoresistive element.

In the first thin-film magnetic head of the invention, each of the first and second read shield layers has: a first end face located in the medium facing surface; a second end face opposite to the first end face; a first width changing portion that continuously decreases in width as the distance from the first end face decreases; and a second width changing portion that continuously decreases in width as the distance from the second end face decreases. Each of the first and second read shield layers has such a plane geometry that four corners of a circumscribed rectangle that circumscribes the plane geometry are cut off. Assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

In the first thin-film magnetic head of the invention, each of the first and second read shield layers has the first width changing portion and the second width changing portion, and has the above-described plane geometry. As a result, an occurrence of track erase and output variations of the read head resulting from the magnetizing of the bias field applying layers are suppressed.

In the present patent application, a plane geometry means a geometry of an object seen from above a top surface thereof wherein the top surface is a surface of a layer to be the object opposite to the base of the layer. The 'rectangle' of the 'circumscribed rectangle' means a rectangle in a broad sense and includes a square.

In the first thin-film magnetic head of the invention, the plane geometry of each of the first and second read shield layers may be such one that two portions of the plane geometry divided by the imaginary center line are line-symmetric with respect to the center line.

In the first thin-film magnetic head of the invention, the first width changing portion may have a first sloped surface and a second sloped surface that are connected to respective ends of the first end face, the ends being opposed to each other in the direction of width, and the second width changing portion may have a third sloped surface and a fourth sloped surface that are connected to respective ends of the second end face, the ends being opposed to each other in the direction of width. In this case, each of the first and second read shield layers may further have a first side surface connecting the first sloped surface to the third sloped surface, and a second side surface connecting the second sloped surface to the fourth sloped surface. Each of the first and second side surfaces may be a flat surface, or a curved surface protruding outward along the direction of width.

In the first thin-film magnetic head of the invention, an angle that falls within a range of 2 to 30 degrees inclusive may be respectively formed between the first sloped surface and a first imaginary plane including the first end face, between the second sloped surface and the first imaginary plane, between the third sloped surface and a second imaginary plane including the second end face, and between the fourth sloped surface and the second imaginary plane.

In the first thin-film magnetic head of the invention, the plane geometry of the first read shield layer and that of the second read shield layer may be identical.

A second thin-film magnetic head of the invention comprises: a medium facing surface that faces toward a recording medium; a magnetoresistive element disposed near the medium facing surface and having a first surface and a second surface that face toward opposite directions and that intersect the medium facing surface, the magnetoresistive element reading data stored on the recording medium by means of a perpendicular magnetic recording system; a first read shield layer disposed to face toward the first surface of the magnetoresistive element; a second read shield layer disposed to face toward the second surface of the magnetoresistive element; bias field applying layers for applying a bias magnetic field to the magnetoresistive element; a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium by means of the perpendicular magnetic recording system; a write shield layer having a first end face located in the medium facing surface and having a portion located away from the medium facing surface and coupled to the pole layer; and a gap layer provided between the pole layer and the write shield layer and having an end face located in the medium facing surface.

In the second thin-film magnetic head of the invention, in the medium facing surface, the first end face of the write shield layer is located forward of the end face of the pole layer along a direction of travel of the recording medium with a specific space created by the thickness of the gap layer. The first end face of the write shield layer is greater in width than the end face of the pole layer. Each of the first read shield layer and the second read shield layer has: a first end face located in the medium facing surface; a second end face opposite to the first end face; a first width changing portion that continuously decreases in width as the distance from the first end face decreases; and a second width changing portion that continuously decreases in width as the distance from the second end face decreases. The write shield layer further has: a second end face opposite to the first end face; a first width changing portion that continuously decreases in width as the distance from the first end face decreases; and a second width changing portion that continuously decreases in width as the distance from the second end face decreases. Each of the first read shield layer, the second read shield layer and the write shield layer may have such a plane geometry that four corners of a circumscribed rectangle that circumscribes the plane geometry are cut off. Assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

In the second thin-film magnetic head of the invention, each of the first read shield layer, the second read shield layer and the write shield layer has the first width changing portion and the second width changing portion, and has the above-described plane geometry. As a result, an occurrence of track erase, output variations of the read head resulting from the magnetizing of the bias field applying layers, and an occurrence of wide-range adjacent track erase are suppressed.

In the second thin-film magnetic head of the invention, the plane geometry of each of the first read shield layer, the second read shield layer and the write shield layer may be such one that two portions of the plane geometry divided by the imaginary center line are line-symmetric with respect to the center line.

In the second thin-film magnetic head of the invention, the first width changing portion may have a first sloped surface and a second sloped surface that are connected to respective ends of the first end face, the ends being opposed to each other in the direction of width; and the second width changing portion has a third sloped surface and a fourth sloped surface that are connected to respective ends of the second end face, the ends being opposed to each other in the direction of width. In this case, each of the first read shield layer, the second read shield layer and the write shield layer may further has a first side surface connecting the first sloped surface to the third sloped surface, and a second side surface connecting the second sloped surface to the fourth sloped surface. Each of the first and second side surfaces may be a flat surface, or a curved surface protruding outward along the direction of width.

In the second thin-film magnetic head of the invention, an angle that falls within a range of 2 to 30 degrees inclusive may be respectively formed between the first sloped surface and a first imaginary plane including the first end face, between the second sloped surface and the first imaginary plane, between the third sloped surface and a second imaginary plane including the second end face, and between the fourth sloped surface and the second imaginary plane.

In the second thin-film magnetic head of the invention, the plane geometry of the first read shield layer, that of the second read shield layer, and that of the write shield layer may be identical.

A head gimbal assembly of the invention comprises: a slider including the first or second thin-film magnetic head of the invention and disposed to face toward a recording medium; and a suspension flexibly supporting the slider.

A head arm assembly of the invention comprises: a slider including the first or second thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the first or second thin-film magnetic head and disposed to face toward a circular-plate-shaped recording medium that is driven to rotate; and an alignment device supporting the slider and aligning the slider with respect to the recording medium.

According to the first thin-film magnetic head of the invention, or each of the head gimbal assembly, the head arm assembly and the magnetic disk drive including the first thin-film magnetic head, each of the first and second read shield layers has the first width changing portion and the second width changing portion, and has the plane geometry previously described. As a result, it is possible to suppress an occurrence of track erase and output variations of the read head resulting from the magnetizing of the bias field applying layers.

According to the second thin-film magnetic head of the invention, or each of the head gimbal assembly, the head arm assembly and the magnetic disk drive including the second thin-film magnetic head, each of the first and second read shield layers and the write shield layer has the first width changing portion and the second width changing portion, and has the plane geometry previously described. As a result, it is possible to suppress an occurrence of track erase, output variations of the read head resulting from the magnetizing of the bias field applying layers, and an occurrence of wide-range adjacent track erase.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

First Embodiment

Figure 1:
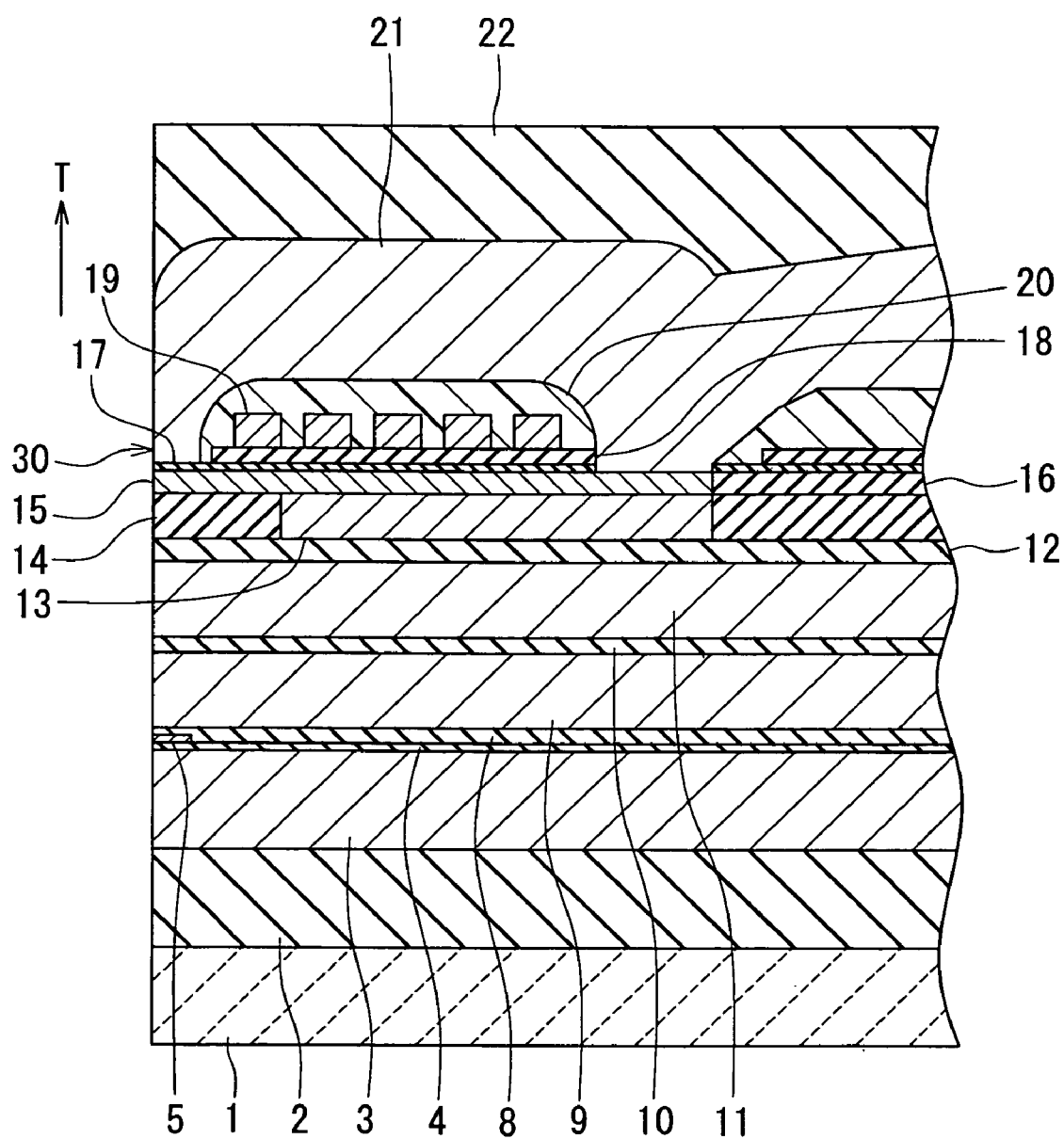
FIG. 1 is a cross-sectional view for illustrating the configuration of a magnetic head of a first embodiment of the invention.
Figure 2:
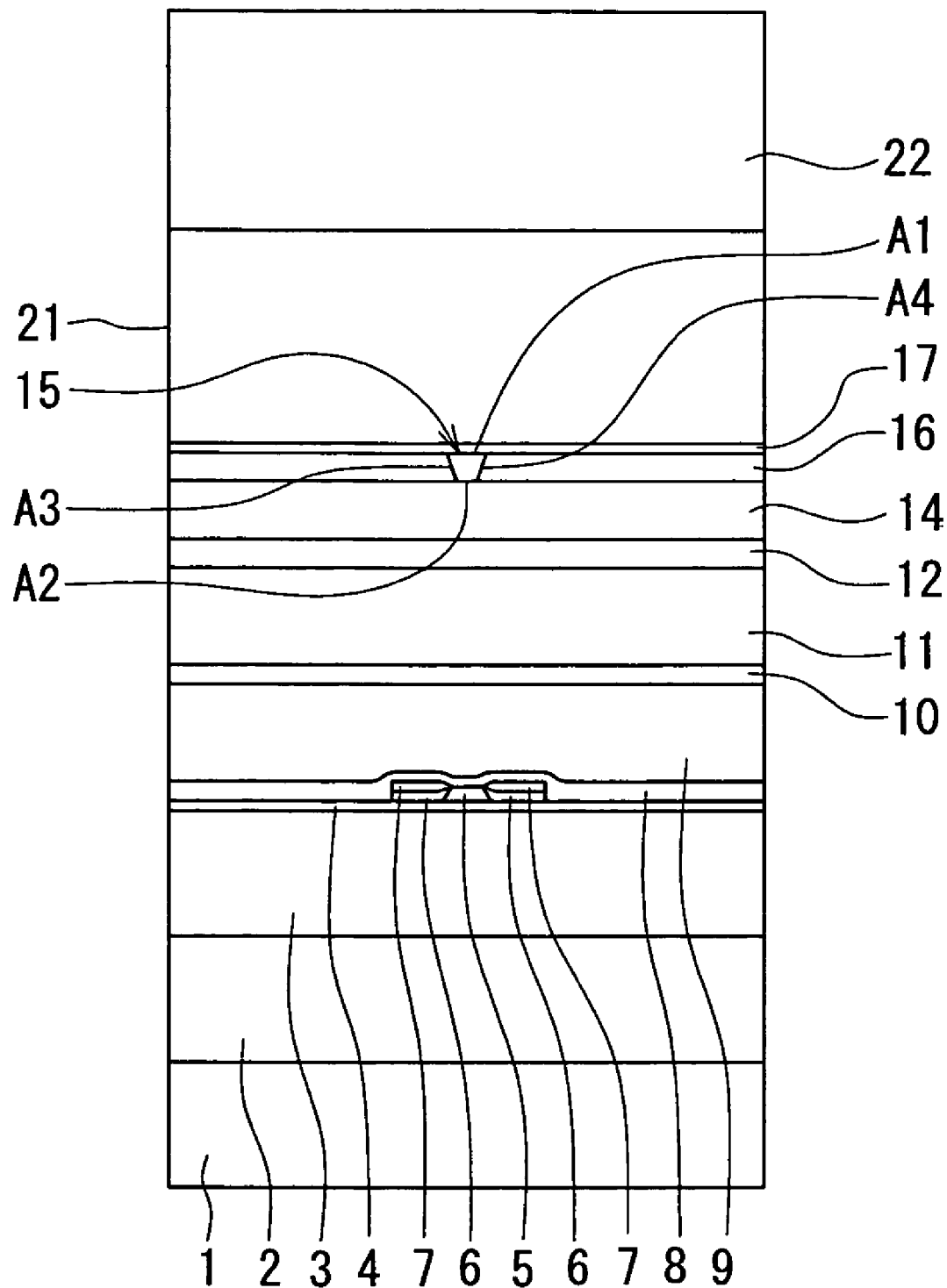
FIG. 2 is a front view of the medium facing surface of the magnetic head of FIG. 1.

Reference is now made to FIG. 1 and FIG. 2 to describe the configuration of a thin-film magnetic head of a first embodiment of the invention. The thin-film magnetic head of the embodiment writes data on a recording medium by means of the perpendicular magnetic recording system, and reads data stored on the medium by means of the perpendicular magnetic recording system. FIG. 1 is a cross-sectional view illustrating the configuration of the thin-film magnetic head of the embodiment. FIG. 2 is a front view illustrating the medium facing surface of the thin-film magnetic head of the embodiment. FIG. 1 illustrates a cross section orthogonal to the medium facing surface and a surface of a substrate. The arrow indicated with T in FIG. 1 shows the direction of travel of a recording medium.

As shown in FIG. 1 and FIG. 2, the thin-film magnetic head (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an insulating layer 4 disposed the first read shield layer 3; a magnetoresistive (MR) element 5 as a read element disposed on the insulating layer 4; and a pair of bias field applying layers 6 disposed on both sides of the MR element 5 on the insulating layer 4.

The magnetic head further comprises: a pair of electrode layers 7 disposed on the pair of bias field applying layers 6; an insulating layer 8 disposed to cover the MR element 5, the electrode layers 7 and the insulating layer 4; and a second read shield layer 9 made of a magnetic material and disposed on the insulating layer 8.

The MR element 5 has an end that is located in a medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element. FIG. 2 illustrates an example in which the MR element 5 is a GMR element of CIP type. If the MR element 5 is a TMR element or a GMR element of CPP type, the pair of electrode layers 7 are disposed to touch the top and bottom surfaces of the MR element 5, respectively, or the read shield layers 3 and 9 are disposed to touch the top and bottom surfaces of the MR element 5, respectively, the read shield layers 3 and 9 also functioning as the electrode layers.

The magnetic head further comprises: a nonmagnetic layer 10 made of a nonmagnetic material such as alumina and disposed on the second read shield layer 9; and a middle magnetic layer 11 made of a magnetic material and disposed on the nonmagnetic layer 10. The portions from the first read shield layer 3 to the middle magnetic layer 11 make up a read head. The middle magnetic layer 11 has a function of a read shield layer and a function of an auxiliary pole of a write head that will be described later.

The magnetic head further comprises: a nonmagnetic layer 12 made of a nonmagnetic material such as alumina and disposed on the middle magnetic layer 11; a yoke layer 13 made of a magnetic material and disposed on the nonmagnetic layer 12; and a nonmagnetic layer 14 made of a nonconductive and nonmagnetic material such as alumina and disposed around the yoke layer 13. An end of the yoke layer 13 closer to the medium facing surface 30 is located at a distance from the medium facing surface 30. The yoke layer 13 and the nonmagnetic layer 14 have flattened top surfaces.

The magnetic head further comprises: a pole layer 15 made of a magnetic material and disposed on the top surfaces of the yoke layer 13 and the nonmagnetic layer 14; and a nonmagnetic layer 16 made of a nonconductive and nonmagnetic material such as alumina and disposed around the pole layer 15. A bottom surface of the pole layer 15 touches the top surface of the yoke layer 13. The pole layer 15 and the nonmagnetic layer 16 have flattened top surfaces.

The magnetic head further comprises: a gap layer 17 disposed on the pole layer 15 and the nonmagnetic layer 16; a nonmagnetic layer 18 made of a nonconductive and nonmagnetic material such as alumina and formed on a region of the gap layer 17 where a coil 19 described later will be disposed; the coil 19 disposed on the nonmagnetic layer 18; and an insulating layer 20 formed to cover the coil 19. The coil 19 is flat-whorl-shaped. The gap layer 17 has an opening located in a region corresponding to the center of the coil 19. The insulating layer 20 is not exposed from the medium facing surface 30. The gap layer 17 may be a nonmagnetic conductive layer.

The magnetic head further comprises a write shield layer 21 made of a magnetic material and disposed on the pole layer 15, the gap layer 17 and the insulating layer 20. The write shield layer 21 is coupled to the pole layer 15 through the opening of the gap layer 17. An end of the write shield layer 21 closer to the medium facing surface 30 is located in the medium facing surface 30. The portions from the nonmagnetic layer 12 to the write shield layer 21 make up a write head.

The magnetic head further comprises a protection layer 22 made of an insulating material such as alumina and formed to cover the write shield layer 21.

As described so far, the magnetic head of the embodiment comprises the medium facing surface 30 that faces toward a recording medium, the read head and the write head. The read head is disposed backward in the direction T of travel of the recording medium (that is, closer to the air inflow end of the slider). The write head is disposed forward in the direction T of travel of the recording medium (that is, closer to the air outflow end of the slider). The magnetic head writes data on the recording medium through the use of the write head and reads data stored on the medium through the use of the read head.

Figure 3:
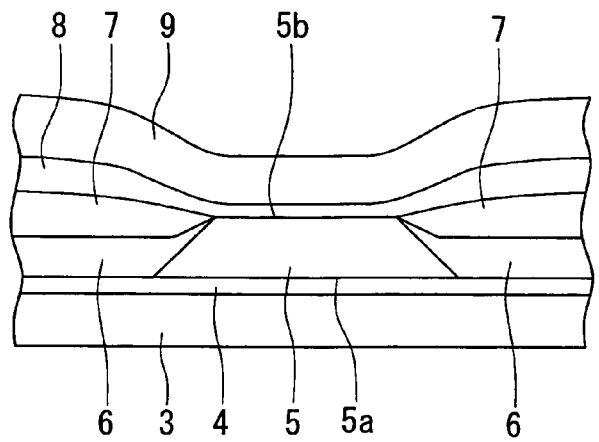
FIG. 3 is a front view of a portion of the medium facing surface of the magnetic head of FIG. 1 that corresponds to a read head.

FIG. 3 illustrates a portion of the medium facing surface corresponding to the read head. As shown in FIG. 3, the read head comprises the MR element 5, and the first read shield layer 3 and the second read shield layer 9 for shielding the MR element 5. The MR element 5 is disposed near the medium facing surface 30 and reads data stored on the recording medium by means of the perpendicular magnetic recording system. The MR element 5 has a first surface (bottom surface) 5a and a second surface (top surface) 5b that face toward opposite directions and that are disposed to intersect the medium facing surface 30. The first read shield layer 3 is disposed to face toward the first surface 5a of the MR element 5 with the insulating layer 4 disposed in between. The second read shield layer 9 is disposed to face toward the second surface 5b of the MR element 5 with the insulating layer 8 disposed in between.

For example, the MR element 5 may incorporate: a nonmagnetic conductive layer having two surfaces that face toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of surfaces of the pinned layer farther from the nonmagnetic conductive layer.

The read head further comprises: a pair of bias field applying layers 6 disposed on both sides of the MR element 5 opposed to each other in the direction of track width; and a pair of electrode layers 7 for feeding a current for detecting magnetic signals to the MR element 5. The bias field applying layers 6 are each made of a hard magnetic layer (a hard magnet) or a layered structure made up of a ferromagnetic layer and an antiferromagnetic layer, for example. The electrode layers 7 are each made of a layered structure made up of a Ta layer and an Au layer, a layered structure made up of a TiW layer and a Ta layer, or a layered structure made up of a TiN layer and a Ta layer, for example. The bias field applying layers 6 are magnetized such that the magnetization in the bias field applying layers 6 is directed to the direction of track width, and apply a bias magnetic field in the direction of track width to the MR element 5.

In the read head, when no external magnetic field is applied to the free layer of the MR element, the direction of magnetization in the free layer is directed to the direction of track width by the bias magnetic field sent from the bias field applying layers 6. On the other hand, the direction of magnetization in the pinned layer is fixed to the direction orthogonal to the medium facing surface 30. Consequently, when no signal magnetic field sent from the recording medium is applied to the free layer, an angle of 90 degrees is maintained between the direction of magnetization in the pinned layer and the direction of magnetization in the free layer. If a signal field in the direction orthogonal to the medium facing surface 30 is sent from the recording medium and applied to the read head, the direction of magnetization in the free layer is changed, and the angle between the direction of magnetization in the pinned layer and the direction of magnetization in the free layer is thereby changed. The electrical resistance of the MR element 5 is changed by this angle. Therefore, it is possible to read data stored on the medium by detecting the change in electrical resistance of the MR element 5. It is possible to obtain the electrical resistance of the MR element 5 from the potential difference between the two electrode layers 7 when a current for detecting magnetic signals is fed to the MR element 5.

The write head comprises the pole layer 15, the gap layer 17, the coil 19, and the write shield layer 21. The coil 19 generates a magnetic field corresponding to data to be written on the recording medium. The pole layer 15 has an end face located in the medium facing surface 30. The pole layer 15 allows a magnetic flux corresponding to the field generated by the coil 19 to pass therethrough and generates a write magnetic field for writing data on the medium by means of the perpendicular magnetic recording system. The write shield layer 21 has an end face located in the medium facing surface 30, and a portion of the write shield layer 21 located away from the medium facing surface 30 is coupled to the pole layer 15. The gap layer 17 has an end face located in the medium facing surface 30, and provided between the pole layer 15 and the write shield layer 21.

At least a portion of the coil 19 is disposed between the pole layer 15 and the write shield layer 21 and insulated from the pole layer 15 and the write shield layer 21. The pole layer 15, the yoke layer 13 and the write shield layer 21 form a magnetic path through which a magnetic flux corresponding to the magnetic field generated by the coil 19 passes.

In the medium facing surface 30, the end face of the write shield layer 21 is located forward of the end face of the pole layer 15 in the direction of travel T of the recording medium (that is, closer to the air outflow end of the slider) with a specific space created by the thickness of the gap layer 17. The width of the end face of the write shield layer 21 is greater than the width of the end face of the pole layer 15. The area of the end face of the write shield layer 21 is greater than the area of the end face of the pole layer 15. The write shield layer 21 is capable of making the magnetic field gradient abrupt by taking in the magnetic flux generated from the end face of the pole layer 15. In addition, the write shield layer 21 has a function of returning the magnetic flux that has been generated from the end face of the pole layer 15 and that has magnetized the recording medium. Furthermore, the write shield layer 21 takes in unwanted expanding components of the returning flux generated from the end face of the pole layer 15 before the components reach the recording medium, and thereby functions as a magnetic shield.

Figure 4:
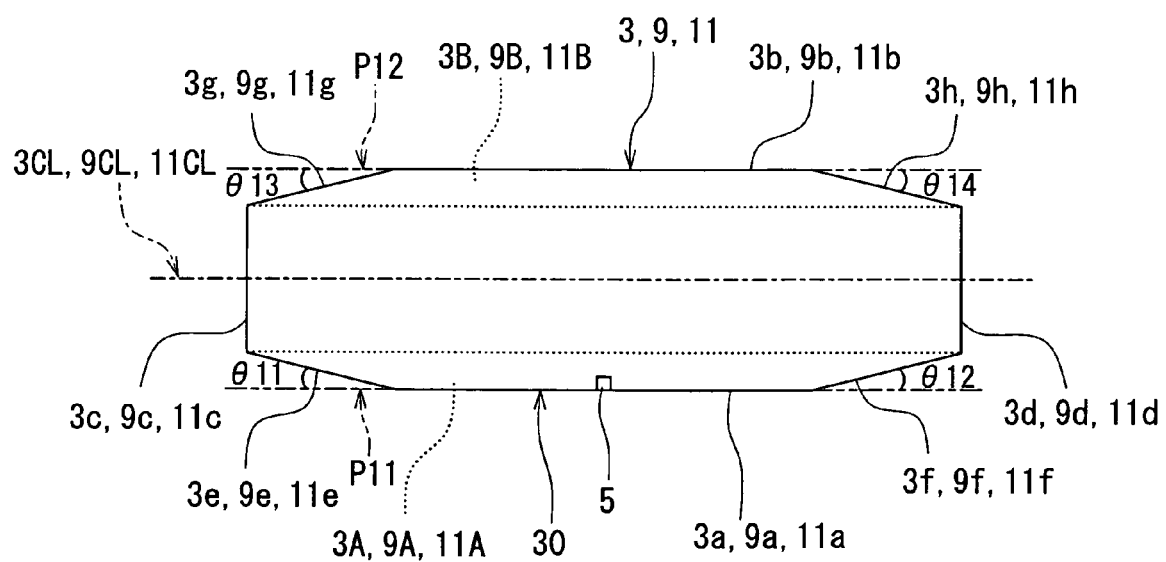
FIG. 4 is a top view illustrating plane geometries of a first read shield layer, a second read shield layer and a middle magnetic layer of the magnetic head of FIG. 1.

Reference is now made to FIG. 4 to describe the shapes of the first read shield layer 3, the second read shield layer 9 and the middle magnetic layer 11 in detail. FIG. 4 is a top view illustrating the plane geometries of the first read shield layer 3, the second read shield layer 9 and the middle magnetic layer 11. As shown in FIG. 4, the plane geometries of the first read shield layer 3, the second read shield layer 9 and the middle magnetic layer 11 are identical.

The layers 3, 9 and 11 respectively have: first end faces 3a, 9a and 11a; second end faces 3b, 9b and 11b that are opposite to the first end faces 3a, 9a and 11a; first side surfaces 3c, 9c and 11c disposed to be orthogonal to the medium facing surface 30; and second side surfaces 3d, 9d and 11d that are opposite to the first side surfaces 3c, 9c and 11c. Each of the first end faces 3a, 9a and 11a, the second end faces 3b, 9b and 11b, the first side surfaces 3c, 9c and 11c, and the second side surfaces 3d, 9d and 11d is a flat surface.

Furthermore, the layers 3, 9 and 11 respectively have: first sloped surfaces 3e, 9e and 11e that connect ends of the first end faces 3*a*, 9*a* and 11*a* (the left-hand ends of FIG. 4) to respective ends of the first side surfaces 3*c*, 9*c* and 11*c* (the ends closer to the medium facing surface 30); second sloped surfaces 3*f*, 9*f* and 11*f* that connect the other ends of the first end faces 3*a*, 9*a* and 11*a* to respective ends of the second side surfaces 3*d*, 9*d* and 11*d* (the ends closer to the medium facing surface 30); third sloped surfaces 3*g*, 9*g* and 11*g* that connect ends of the second end faces 3*b*, 9*b* and 11*b* (the left-hand ends of FIG. 4) to the respective other ends of the first side surfaces 3*c*, 9*c* and 11*c*; and fourth sloped surfaces 3*h*, 9*h* and 11*h* that connect the other ends of the second end faces 3*b*, 9*b* and 11*b* to the respective other ends of the second side surfaces 3*d*, 9*d* and 11*d*.

The first end faces 3*a*, 9*a* and 11*a* are parallel to the second end faces 3*b*, 9*b* and 11*b*. The first side surfaces 3*c*, 9*c* and 11*c* are parallel to the second side surfaces 3*d*, 9*d* and 11*d*. The first sloped surfaces 3*e*, 9*e* and 11*e* are parallel to the fourth sloped surfaces 3*h*, 9*h* and 11*h*. The second sloped surfaces 3*f*, 9*f* and 11*f* are parallel to the third sloped surfaces 3*g*, 9*g* and 11*g*.

The layers 3, 9 and 11 respectively have: first width changing portions 3A, 9A and 11A in which the width continuously decreases as the distance from the first end faces 3*a*, 9*a* and 11*a* decreases; and second width changing portions 3B, 9B and 11B in which the width continuously decreases as the distance from the second end faces 3*b*, 9*b* and 11*b* decreases.

The first width changing portions 3A, 9A and 11A are respective portions of the layers 3, 9 and 11 that are closer to the medium facing surface 30 than the junction between the first sloped surfaces 3*e*, 9*e*, 11*e* and the first side surfaces 3*c*, 9*c*, 11*c* and than the junction between the second sloped surfaces 3*f*, 9*f*, 11*f* and the second side surfaces 3*d*, 9*d*, 11*d*. Therefore, the first width changing portions 3A, 9A and 11A respectively incorporate the first sloped surfaces 3*e*, 9*e* and 11*e* and the second sloped surfaces 3*f*, 9*f* and 11*f* that are respectively connected to both ends of the first end faces 3*a*, 9*a* and 11*a*, the ends being opposed to each other in the direction of width.

The second width changing portions 3B, 9B and 11B are respective portions of the layers 3, 9 and 11 that are farther from the medium facing surface 30 than the junction between the third sloped surfaces 3*g*, 9*g*, 11*g* and the first side surfaces 3*c*, 9*c*, 11*c* and than the junction between the fourth sloped surfaces 3*h*, 9*h*, 11*h* and the second side surfaces 3*d*, 9*d*, 11*d*. Therefore, the second width changing portions 3B, 9B and 11B respectively incorporate the third sloped surfaces 3*g*, 9*g* and 11*g* and the fourth sloped surfaces 3*h*, 9*h* and 11*h* that are respectively connected to both ends of the second end faces 3*b*, 9*b* and 11*b*, the ends being opposed to each other in the direction of width.

The maximum width of each of the layers 3, 9 and 11 is approximately 90 μm, for example. It is preferred that the width of each of the first end faces 3*a*, 9*a* and 11*a* and the second end faces 3*b*, 9*b* and 11*b* be approximately 80 percent of the maximum width of each of the layers 3, 9 and 11.

As shown in FIG. 4, each of the first sloped surfaces 3*e*, 9*e* and 11*e* forms an angle θ11 with respect to an imaginary plane P11 including the first end faces 3*a*, 9*a* and 11*a*. Each of the second sloped surfaces 3*f*, 9*f* and 11*f* forms an angle θ12 with respect to the imaginary plane P11. Each of the third sloped surfaces 3*g*, 9*g* and 11*g* forms an angle θ13 with respect to an imaginary plane P12 including the second end faces 3*b*, 9*b* and 11*b*. Each of the fourth sloped surfaces 3*h*, 9*h* and 11*h* forms an angle θ14 with respect to the imaginary plane P12. The angles θ11, θ12, θ13 and θ14 are equal. The angles θ11, θ12, θ13 and θ14 preferably fall within a range of 2 to 30 degrees inclusive, and more preferably a range of 4 to 25 degrees inclusive. The reason will be described in detail later.

In the example shown in FIG. 4, each of the layers 3, 9 and 11 has a plane geometry in which two portions are divided from each other by each of imaginary center lines 3CL, 9CL and 11CL parallel to the medium facing surface 30, and these two portions are line-symmetric with respect to each of the center lines 3CL, 9CL and 11CL. However, as will be described in detail later, it is not absolutely necessary that the two portions divided from each other by each of the center lines 3CL, 9CL and 11CL are line-symmetric but it is acceptable as long as they are nearly line-symmetric.

Figure 5:
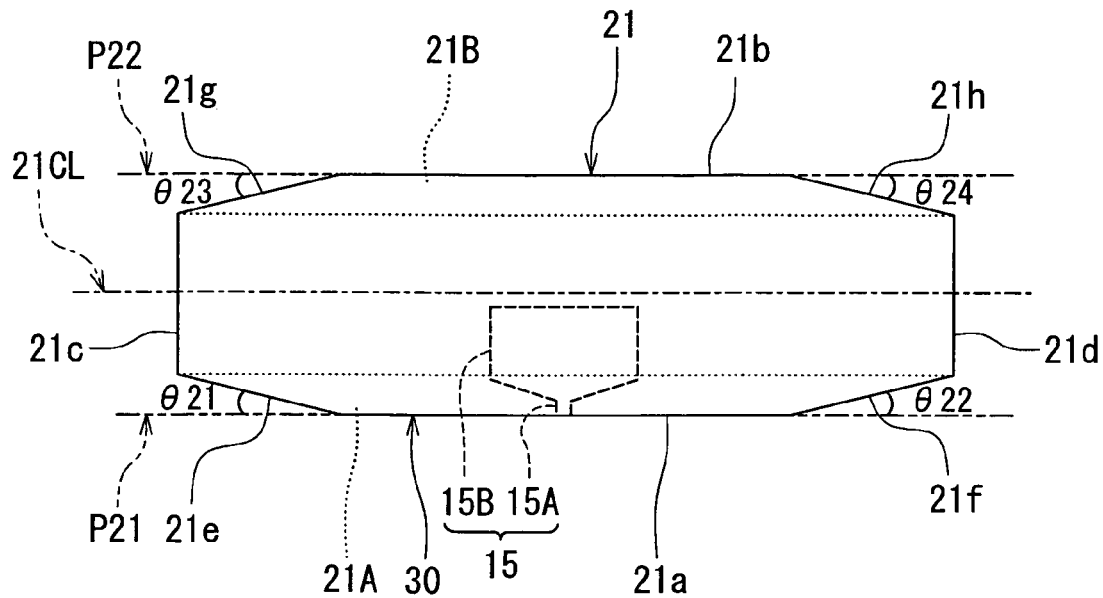
FIG. 5 is a top view illustrating a plane geometry of the write shield layer of the magnetic head of FIG. 1.

Reference is now made to FIG. 5 to describe the shape of the write shield layer 21 in detail. FIG. 5 is a top view of the plane geometry of the write shield layer 21. The plane geometry of the write shield layer 21 is identical to that of each of the first read shield layer 3, the second read shield layer 9 and the middle magnetic layer 11.

The write shield layer 21 has: a first end face 21*a* located in the medium facing surface 30; a second end face 21*b* opposite to the first end face 21*a*; a first side surface 21*c* located to be orthogonal to the medium facing surface 30; and a second side surface 21*d* opposite to the first side surface 21*c*. Each of the first end face 21*a*, the second end face 21*b*, the first side surface 21*c* and the second side surface 21*d* is a flat surface.

The write shield layer 21 further has: a first sloped surface 21*e* that connects an end of the first end face 21*a* (the left-hand end of FIG. 5) to an end of the first side surface 21*c* (the end closer to the medium facing surface 30); a second sloped surface 21*f* that connects the other end of the first end face 21*a* to an end of the second side surface 21*d* (the end closer to the medium facing surface 30); a third sloped surface 21*g* that connects an end of the second end face 21*b* (the left-hand end of FIG. 5) to the other end of the first side surface 21*c*; and a fourth sloped surface 21*h* that connects the other end of the second end face 21*b* to the other end of the second side surface 21*d*.

The first end face 21*a* is parallel to the second end face 21*b*. The first side surface 21*c* is parallel to the second side surface 21*d*. The first sloped surface 21*e* is parallel to the fourth sloped surface 21*h*. The second sloped surface 21*f* is parallel to the third sloped surface 21*g*.

The write shield layer 21 has: a first width changing portions 21A that continuously decreases in width as the distance from the first end face 21*a* decreases; and a second width changing portion 21B that continuously decreases in width as the distance from the second end face 21*b* decreases.

The first width changing portion 21A is a portion of the write shield layer 21 that is closer to the medium facing surface 30 than the junction between the first sloped surface 21*e* and the first side surface 21*c* and than the junction between the second sloped surface 21*f* and the second side surface 21*d*. Therefore, the first width changing portion 21A incorporates the first sloped surface 21*e* and the second sloped surface 21*f* that are connected to the ends of the first end face 21*a* opposed to each other in the direction of width.

The second width changing portion 21B is a portion of the write shield layer 21 that is farther from the medium facing surface 30 than the junction between the third sloped surface 21*g* and the first side surface 21*c* and than the junction between the fourth sloped surface 21*h* and the second side surface 21*d*. Therefore, the second width changing portion 21B incorporates the third sloped surface 21*g* and the fourth sloped surface 21*h* that are connected to the ends of the second end face 21*b* opposed to each other in the direction of width.

As shown in FIG. 5, the first sloped surface 21e forms an angle θ21 with respect to an imaginary plane P21 including the first end face 21a. The second sloped surface 21f forms an angle θ22 with respect to the imaginary plane P21. The third sloped surface 21g forms an angle θ23 with respect to an imaginary plane P22 including the second end face 21b. The fourth sloped surface 21h forms an angle θ24 with respect to the imaginary plane P22. The angles θ21, θ22, θ23 and θ24 are equal. The angles θ21, θ22, θ23 and θ24 preferably fall within a range of 2 to 30 degrees inclusive, and more preferably a range of 4 to 25 degrees inclusive. The reason will be described in detail later.

In the example shown in FIG. 5, the write shield layer 21 has a plane geometry in which two portions are divided from each other by an imaginary center line 21CL parallel to the medium facing surface 30, and these two portions are line-symmetric with respect to the center line 21CL. However, as will be described in detail later, it is not absolutely necessary that the two portions divided from each other by the center line 21CL are line-symmetric but it is acceptable as long as they are nearly line-symmetric.

Figure 6:
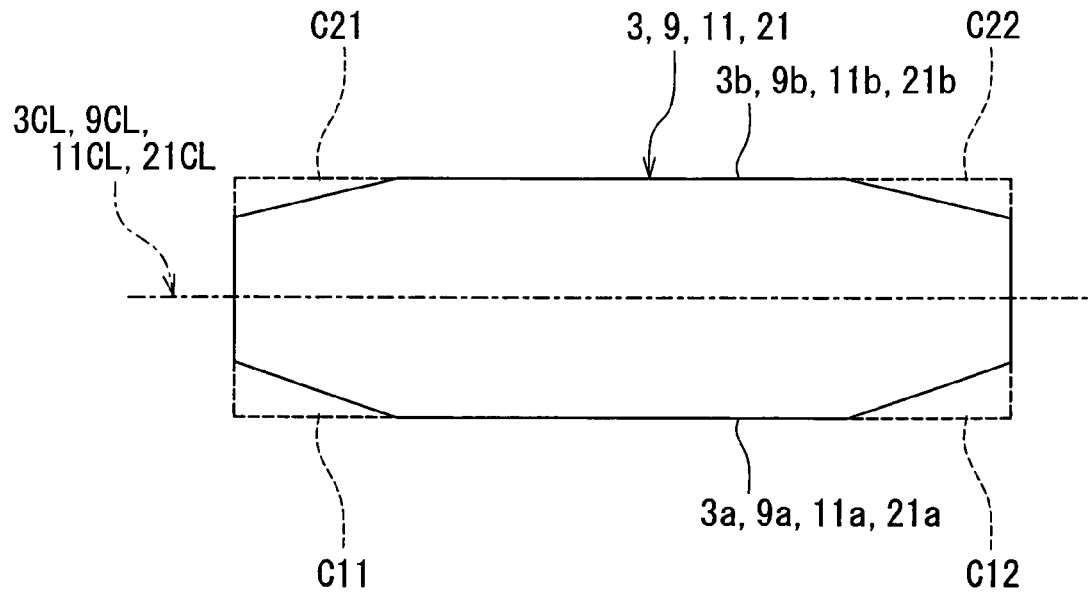
FIG. 6 is a view for explaining the plane geometries of the first read shield layer, the second read shield layer, the middle magnetic layer and the write shield layer of the magnetic head of FIG. 1.
Figure 7:
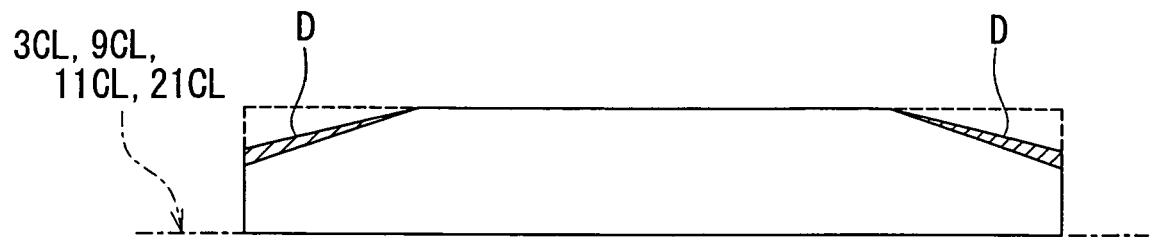
FIG. 7 is a view for explaining the plane geometries of the first read shield layer, the second read shield layer, the middle magnetic layer and the write shield layer of the magnetic head of FIG. 1.

Reference is now made to FIG. 6 and FIG. 7 to describe the plane geometries of the first read shield layer 3, the second read shield layer 9, the middle magnetic layer 11 and the write shield layer 21 in detail. FIG. 6 and FIG. 7 are views for illustrating the plane geometries of these layers 3, 9, 11 and 21.

As shown in FIG. 6, the plane geometry of each of the layers 3, 9, 11 and 21 is such a geometry that four corners of a circumscribed rectangle that circumscribes the plane geometry are cut off. Here, among four pieces separated from the circumscribed rectangle to form this plane geometry, two pieces closer to each of the first end faces 3a, 9a, 11a and 21a are defined as first pieces C11 and C12, and the other two pieces closer to each of the second end faces 3b, 9b, 11b and 21b are defined as second pieces C21 and C22.

Furthermore, assuming that the plane geometry of each of the layers 3, 9, 11 and 21 and the above-mentioned circumscribed rectangle are folded along each of the imaginary center lines 3CL, 9CL, 11CL and 21CL, as shown in FIG. 7, it is defined that portions D of the first and second pieces C11, C12 and C21, C22 that are not laid over each other have an area Sd. The sum of areas of the first pieces C11 and C12 and the second pieces C21 and C22 is defined as Ss. In the embodiment, the value obtained by dividing the area Sd of the portions D by the sum Ss of areas of the first pieces C11 and C12 and the second pieces C21 and C22 is defined as a parameter P that indicates a deviation from the symmetry. The possible range of the parameter P is 0 to 1 inclusive. The parameter P is zero if, as shown in FIG. 4 and FIG. 5, the plane geometry of each of the layers 3, 9, 11 and 21 is such one that the two portions of the plane geometry divided by each of the imaginary center lines 3CL, 9CL, 11CL and 21CL are line-symmetric with respect to each of the center lines 3CL, 9CL, 11CL and 21CL. If the parameter P is other than zero, these two portions are not line-symmetric. However, the two portions are nearly line-symmetric as long as the parameter P is close to zero even though the parameter P is not zero. As the parameter P increases, the two portions go far from the symmetry. In the embodiment it is defined that the parameter P should fall within a range of 0 to 0.2 inclusive. The reason will be described in detail later.

Reference is now made to FIG. 5 to describe the shape of the pole layer 15 in detail. As shown in FIG. 5, the pole layer 15 incorporates a track width defining portion 15A and a wide portion 15B. The track width defining portion 15A has an end located in the medium facing surface 30. The wide portion 15B is coupled to the other end of the track width defining portion 15A and has a width greater than the width of the track width defining portion 15A. The top surface of the track width defining portion 15A has a nearly uniform width. The width of the top surface of the track width defining portion 15A taken in the medium facing surface 30 defines the track width. For example, the wide portion 15B is equal in width to the track width defining portion 15A at the interface with the track width defining portion 15A, and gradually increases in width as the distance from the medium facing surface 30 increases and then maintains a specific width to the end of the wide portion 15B.

As shown in FIG. 2, the end face of the pole layer 15 (the track width defining portion 15A) located in the medium facing surface 30 has a shape of trapezoid that has: a first side A1 farthest from the substrate 1; a second side A2 opposite to the first side A1; a third side A3 connecting an end of the first side A1 to an end of the second side A2; and a fourth side A4 connecting the other end of the first side A1 to the other end of the second side A2. The first side A1 defines the track width. The width of the end face of the pole layer 15 decreases as the distance from the second side A2 decreases, that is, as the distance from the substrate 1 decreases. As a result, it is possible to suppress a phenomenon in which, when data is written on a specific track, data stored on an adjacent track is erased because of a skew. The skew is a tilt of the magnetic head with respect to the tangent of the circular track of a circular-plate-shaped recording medium. The end face of the pole layer 15 may be rectangle-shaped or square-shaped. Alternatively, the end face of the pole layer 15 may have a shape of a triangle without the second side A2.

A variety of modifications of the magnetic head of the embodiment are possible, as will now be described. First, it is not absolutely necessary to provide the yoke layer 13. Alternatively, the yoke layer 13 may be provided on the top of the pole layer 15 or may be provided on the top and at the bottom of the pole layer 15. Furthermore, in place of the flat-whorl-shaped coil 19, a coil wound around the pole layer 15 in a helical manner may be provided. Alternatively, flat-whorl-shaped coils may be provided on the top and at the bottom of the pole layer 15, respectively. The write shield layer 21 may be made up of two or more layers.

A recording medium used in a magnetic disk drive incorporating the magnetic head of the embodiment may comprise a substrate, and a horizontally magnetized layer and a perpendicularly magnetized layer that are stacked on the substrate in this order. The perpendicularly magnetized layer is one in which data is stored. The horizontally magnetized layer is one that forms a magnetic path through which a magnetic flux passes.

The effects of the magnetic head of the embodiment will now be described. First, in the magnetic head of the embodiment, the first read shield layer 3, the second read shield layer 9, the middle magnetic layer 11 and the write shield layer 21 respectively have the first width changing portions 3A, 9A, 11A and 21A in which the width continuously decreases as the distance from the respective first end faces 3a, 9a, 11a and 21a decreases. It is thereby possible to suppress an occurrence of track erase, according to the embodiment.

In the magnetic head of the embodiment, the first read shield layer 3, the second read shield layer 9, the middle magnetic layer 11 and the write shield layer 21 respectively have the second width changing portions 3B, 9B, 11B and 21B in which the width continuously decreases as the distance from the respective second end faces 3b, 9b, 11b and 21b decreases. Furthermore, in the embodiment, each of the first read shield layer 3, the second read shield layer 9, the middle magnetic layer 11 and the write shield layer 21 has such a plane geometry that the previously-mentioned parameter P falls within a range of 0 to 0.2 inclusive. In other words, the plane geometry of each of these layers 3, 9, 11 and 21 is such one that the two portions divided by each of the imaginary center lines 3CL, 9CL, 11CL and 21CL are line-symmetric or nearly line-symmetric with respect to each of the center lines 3CL, 9CL, 11CL and 21CL. These features of the embodiment make it possible to suppress output variations of the read head resulting from the magnetizing of the bias field applying layers 6.

In the magnetic head of the embodiment, the write shield layer 21 has the first width changing portion 21A and the second width changing portion 21B. In addition, the plane geometry of the write shield layer 21 is such one that, as described above, the two portions divided by the center line 21CL are line-symmetric or nearly line-symmetric with respect to the center line 21CL. As a result, it is possible to suppress an occurrence of wide-range adjacent track erase, according to the embodiment.

The reasons that the foregoing effects of the embodiment are obtained will be described in detail, referring to results of experiments, after a description of a second embodiment.

In the first embodiment, the plane geometries of the first read shield layer 3, the second read shield layer 9, the middle magnetic layer 11 and the write shield layer 21 are equal. It is therefore possible to pattern these layers 3, 9, 11 and 21 through the use of masks having identical shapes. As a result, it is possible to improve the efficiency in manufacture of magnetic heads.

Figure 8:
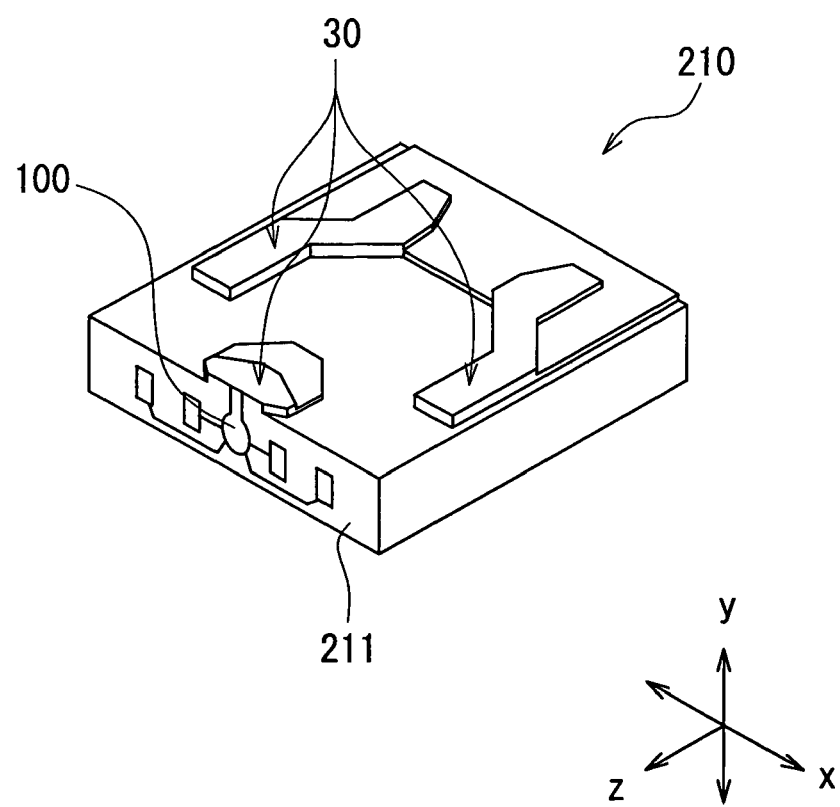
FIG. 8 is a perspective view illustrating a slider that a head gimbal assembly of the first embodiment of the invention includes.

A head gimbal assembly, a head arm assembly and a magnetic disk drive of the embodiment will now be described. Reference is made to FIG. 8 to describe a slider 210 incorporated in the head gimbal assembly. In the magnetic disk drive the slider 210 is placed to face toward a magnetic disk platter that is a circular-plate-shaped recording medium to be driven to rotate. The slider 210 has a base body 211 made up mainly of the substrate 1 and the protection layer 22 of FIG. 1. The base body 211 is nearly hexahedron-shaped. One of the six surfaces of the base body 211 faces toward the magnetic disk platter. The medium facing surface (air bearing surface) 30 is formed in this one of the surfaces. When the magnetic disk platter rotates in the z direction of FIG. 8, an airflow passes between the magnetic disk platter and the slider 210, and a lift is thereby generated below the slider 210 in the y direction of FIG. 8 and exerted on the slider 210. The slider 210 flies over the magnetic disk platter by means of the lift. The x direction of FIG. 8 is across the tracks of the magnetic disk platter. A thin-film magnetic head 100 of the embodiment is formed near the air-outflow-side end (the end located at the lower left of FIG. 8) of the slider 210.

Figure 9:
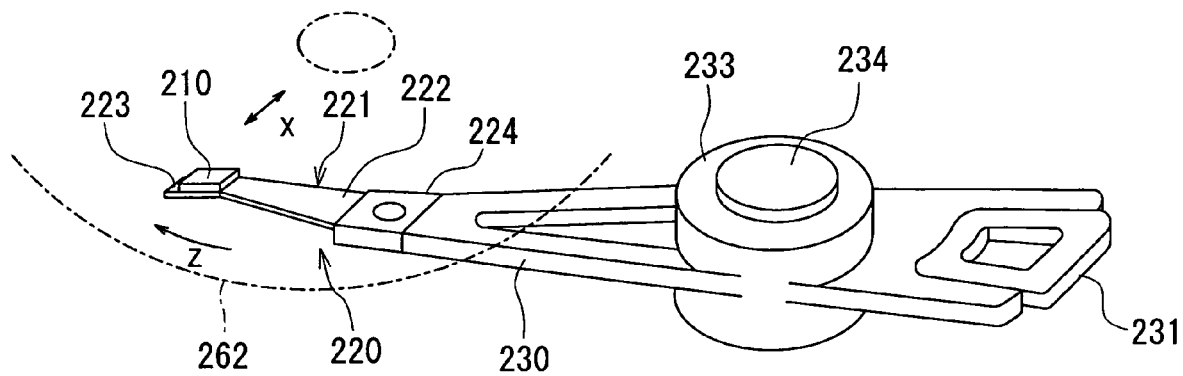
FIG. 9 is a perspective view illustrating a head arm assembly of the first embodiment of the invention.

Reference is now made to FIG. 9 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 9 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 10:
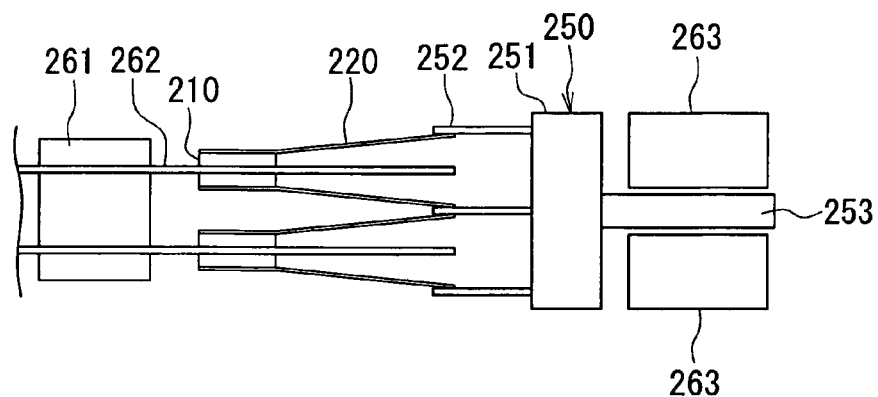
FIG. 10 is a view for illustrating a main part of a magnetic disk drive of the first embodiment of the invention.
Figure 11:
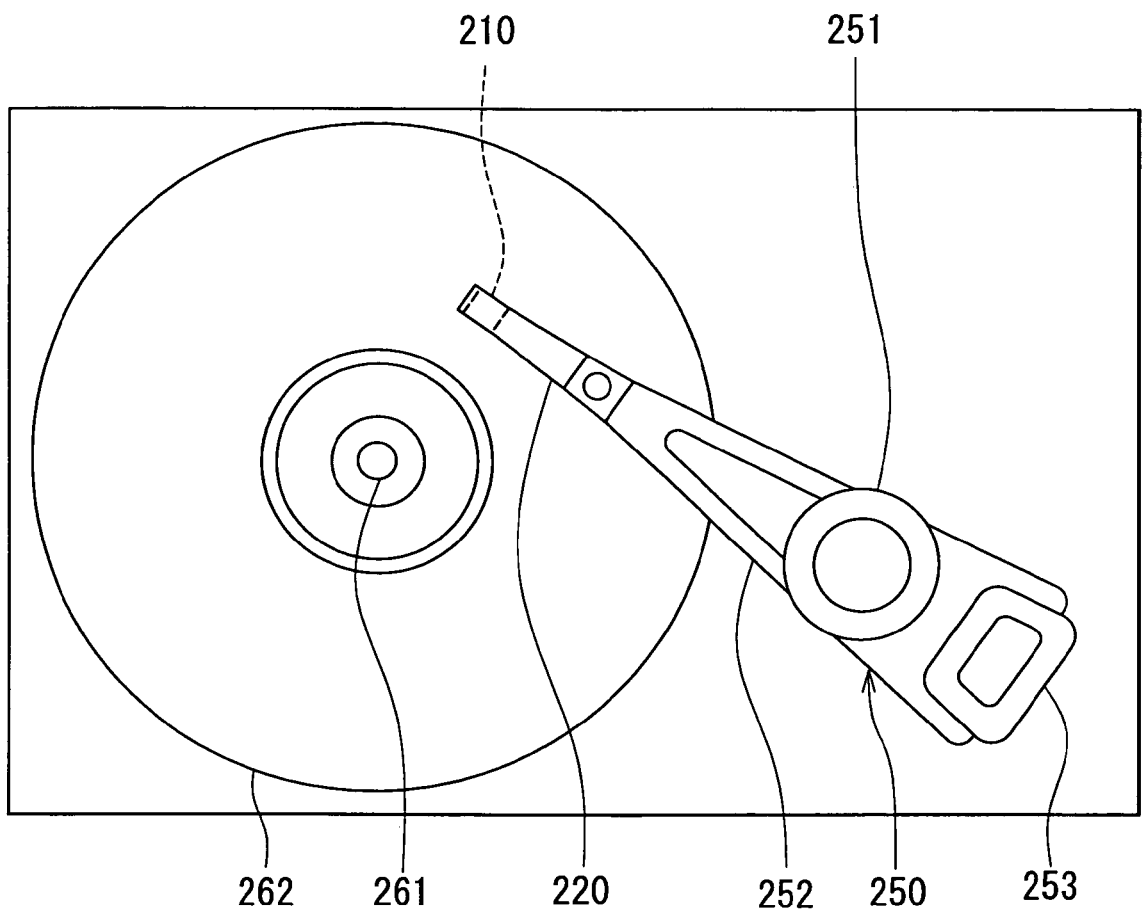
FIG. 11 is a top view of the magnetic disk drive of the first embodiment of the invention.

Reference is now made to FIG. 10 and FIG. 11 to describe an example of the head stack assembly and the magnetic disk drive of the embodiment. FIG. 10 illustrates the main part of the magnetic disk drive. FIG. 11 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing magnetic head of the embodiment.

Second Embodiment

Figure 12:
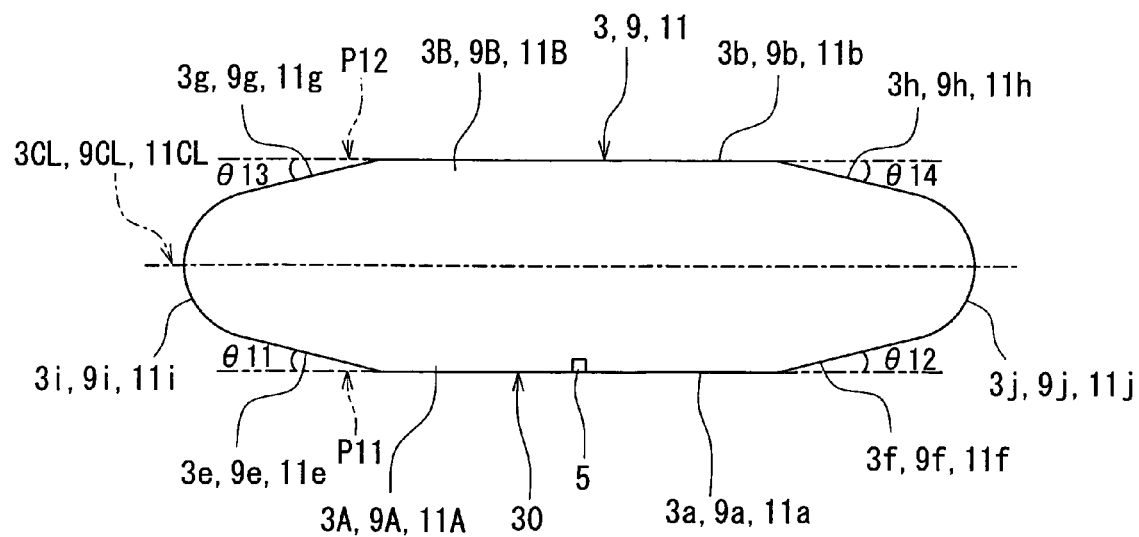
FIG. 12 is a top view illustrating plane geometries of a first read shield layer, a second read shield layer and a middle magnetic layer of a second embodiment of the invention.
Figure 13:
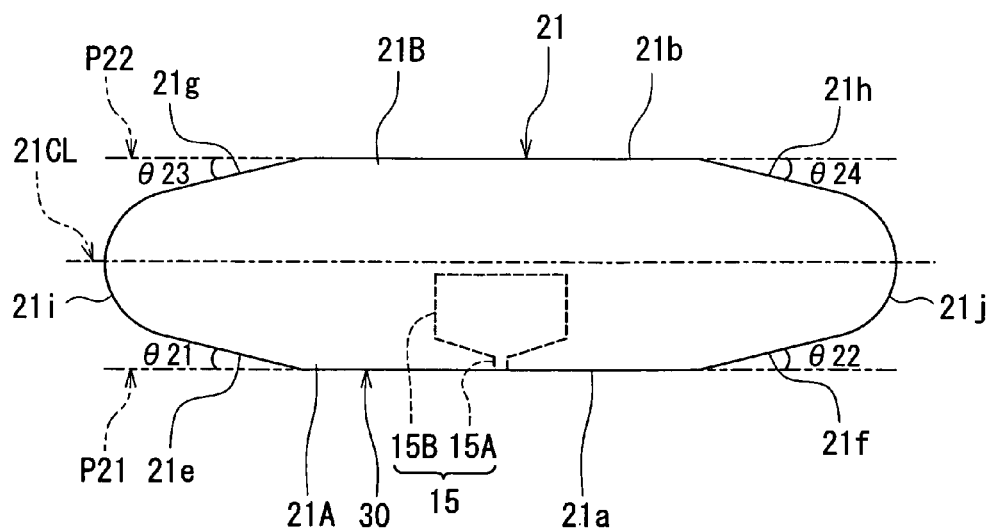
FIG. 13 is a top view illustrating a plane geometry of a write shield layer of the second embodiment of the invention.

Reference is now made to FIG. 12 and FIG. 13 to describe a second embodiment of the invention. FIG. 12 is a top view illustrating the plane geometries of the first read shield layer 3, the second read shield layer 9 and the middle magnetic layer 11 of the second embodiment. As shown in FIG. 12, the plane geometries of the first read shield layer 3, the second read shield layer 9 and the middle magnetic layer 11 are identical.

As shown in FIG. 12, the first read shield layer 3, the second read shield layer 9 and the middle magnetic layer 11 of the second embodiment respectively have first side surfaces 3i, 9i and 11i and second side surfaces 3j, 9j and 11j, in place of the first side surfaces 3c, 9c and 11c and the second side surfaces 3d, 9d and 11d of the first embodiment. Each of the first side surfaces 3i, 9i and 11i and the second side surfaces 3j, 9j and 11j is a curved surface protruding outward along the direction of width. This curved surface may be a surface that is part of a cylinder.

The first width changing portions 3A, 9A and 11A of the second embodiment are portions of the layers 3, 9 and 11 that are closer to the medium facing surface 30 than the points at which the width is greatest. The second width changing portions 3B, 9B and 11B of the second embodiment are portions of the layers 3, 9 and 11 that are farther from the medium facing surface 30 than the points at which the width is greatest.

In the example shown in FIG. 12, each of the layers 3, 9 and 11 has a plane geometry in which two portions are divided from each other by each of imaginary center lines 3CL, 9CL and 11CL parallel to the medium facing surface 30, and these two portions are line-symmetric with respect to each of the center lines 3CL, 9CL and 11CL. However, it is not absolutely necessary that the two portions divided from each other by each of the center lines 3CL, 9CL and 11CL are line-symmetric but it is acceptable as long as they are nearly line-symmetric.

FIG. 13 is a top view of the plane geometry of the write shield layer 21 of the second embodiment. The plane geometry of the write shield layer 21 is identical to that of each of the first read shield layer 3, the second read shield layer 9 and the middle magnetic layer 11.

As shown in FIG. 13, the write shield layer 21 of the second embodiment has a first side surface 21i and a second side surface 21j, in place of the first side surface 21c and the second side surface 21d of the first embodiment. Each of the first side surface 21i and the second side surface 21j is a curved surface protruding outward along the direction of width. This curved surface may be a surface that is part of a cylinder.

The first width changing portion 21A of the second embodiment is a portion of the write shield layer 21 that is closer to the medium facing surface 30 than the point at which the width is greatest. The second width changing portion 21B of the second embodiment is a portion of the write shield layer 21 that is farther from the medium facing surface 30 than the point at which the width is greatest.

In the example shown in FIG. 13, the write shield layer 21 has a plane geometry in which two portions are divided from each other by an imaginary center line 21CL parallel to the medium facing surface 30, and these two portions are line-symmetric with respect to the center line 21CL. However, it is not absolutely necessary that the two portions divided from each other by the center line 21CL are line-symmetric but it is acceptable as long as they are nearly line-symmetric.

Figure 14:
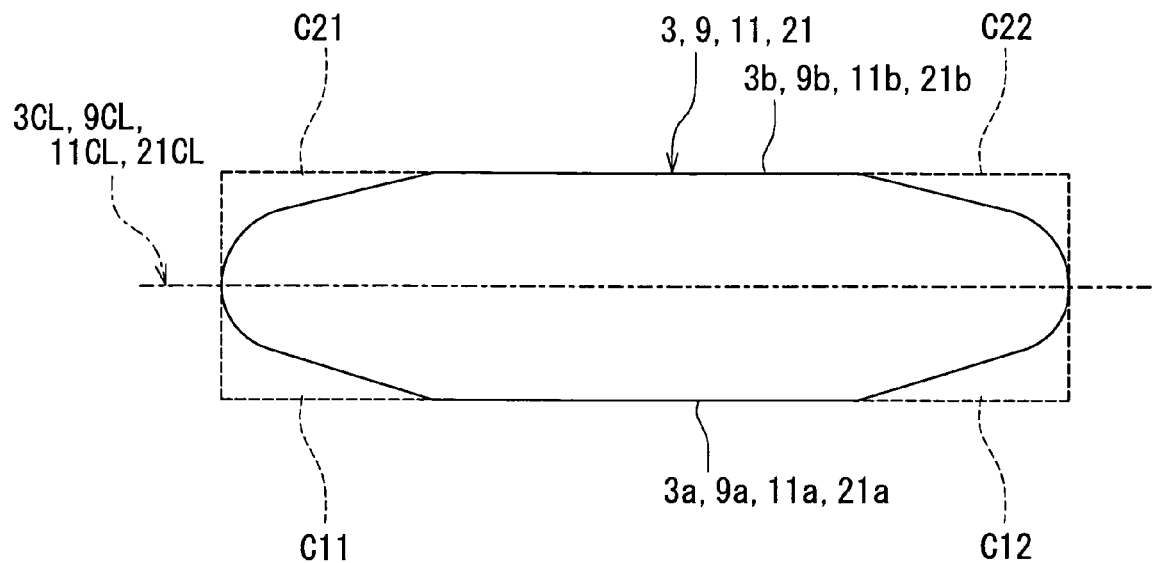
FIG. 14 is a view for explaining the plane geometries of the first read shield layer, the second read shield layer, the middle magnetic layer and the write shield layer of the second embodiment of the invention.
Figure 15:
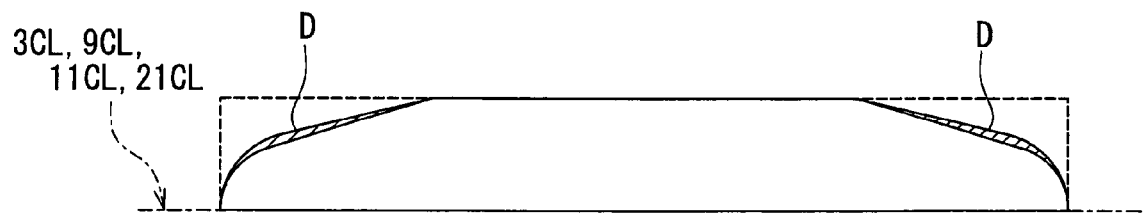
FIG. 15 is a view for explaining the plane geometries of the first read shield layer, the second read shield layer, the middle magnetic layer and the write shield layer of the second embodiment of the invention.

Reference is now made to FIG. 14 and FIG. 15 to describe the plane geometries of the first read shield layer 3, the second read shield layer 9, the middle magnetic layer 11 and the write shield layer 21 in detail. FIG. 14 and FIG. 15 are views for illustrating the plane geometries of these layers 3, 9, 11 and 21.

As shown in FIG. 14, each of the layers 3, 9, 11 and 21 has such a plane geometry that four corners of a circumscribed rectangle that circumscribes the plane geometry are cut off. Here, among four pieces separated from the circumscribed rectangle to form this plane geometry, two pieces closer to each of the first end faces 3a, 9a, 11a and 21a are defined as first pieces C11 and C12, and the other two pieces closer to each of the second end faces 3b, 9b, 11b and 21b are defined as second pieces C21 and C22.

Furthermore, assuming that the plane geometry of each of the layers 3, 9, 11 and 21 and the above-mentioned circumscribed rectangle are folded along each of the imaginary center lines 3CL, 9CL, 11CL and 21CL that are parallel to the medium facing surface 30, as shown in FIG. 15, it is defined that portions D of the first and second pieces C11, C12 and C21, C22 that are not laid over each other have an area Sd. In addition, the sum of the areas of the first pieces C11 and C12 and the second pieces C21 and C22 is defined as Ss. In the second embodiment, as in the first embodiment, the value obtained by dividing the area Sd of the portions D by the sum Ss of the areas of the first pieces C11 and C12 and the second pieces C21 and C22 is defined as the parameter P that indicates a deviation from the symmetry. The parameter P is zero if, as shown in FIG. 12 and FIG. 13, the plane geometry of each of the layers 3, 9, 11 and 21 is such one that the two portions of the plane geometry divided by each of the imaginary center lines 3CL, 9CL, 11CL and 21CL are line-symmetric with respect to each of the center lines 3CL, 9CL, 11CL and 21CL. If the parameter P is other than zero, these two portions are not line-symmetric. However, the two portions are nearly line-symmetric as long as the parameter P is close to zero even though the parameter P is not zero. As the parameter P increases, the two portions go far from the line-symmetry. In the embodiment it is defined that the parameter P should fall within a range of 0 to 0.2 inclusive.

The remainder of configuration, function and effects of the second embodiment are similar to those of the first embodiment.

The effects of the magnetic heads of the first and second embodiments will now be described in detail, referring to results of first to fifth experiments performed for confirming the effects of the magnetic heads of the first and second embodiments.

[First Experiment]

The first experiment relates to track erase. In the first experiment samples of magnetic heads of first to third types described below were employed.

The sample of the first type corresponds to the first embodiment. That is, the sample of the first type incorporates the first read shield layer 3, the second read shield layer 9 and the middle magnetic layer 11 that have shapes shown in FIG. 4, and the write shield layer 21 that has a shape shown in FIG. 5. In the sample of the first type, the maximum width of the layers 3, 9, 11 and 21 is approximately 90 μm. The width of each of the first end faces 3a, 9a, 11a and 21a and the second end faces 3b, 9b, 11b and 21b is approximately 72 μm.

The sample of the second type corresponds to the second embodiment. That is, the sample of the second type incorporates the first read shield layer 3, the second read shield layer 9 and the middle magnetic layer 11 that have shapes shown in FIG. 12, and the write shield layer 21 that has a shape shown in FIG. 13. In the sample of the second type, the maximum width of the layers 3, 9, 11 and 21 is approximately 96 μm. The width of each of the first end faces 3a, 9a, 11a and 21a and the second end faces 3b, 9b, 11b and 21b is approximately 72 μm.

Figure 16:
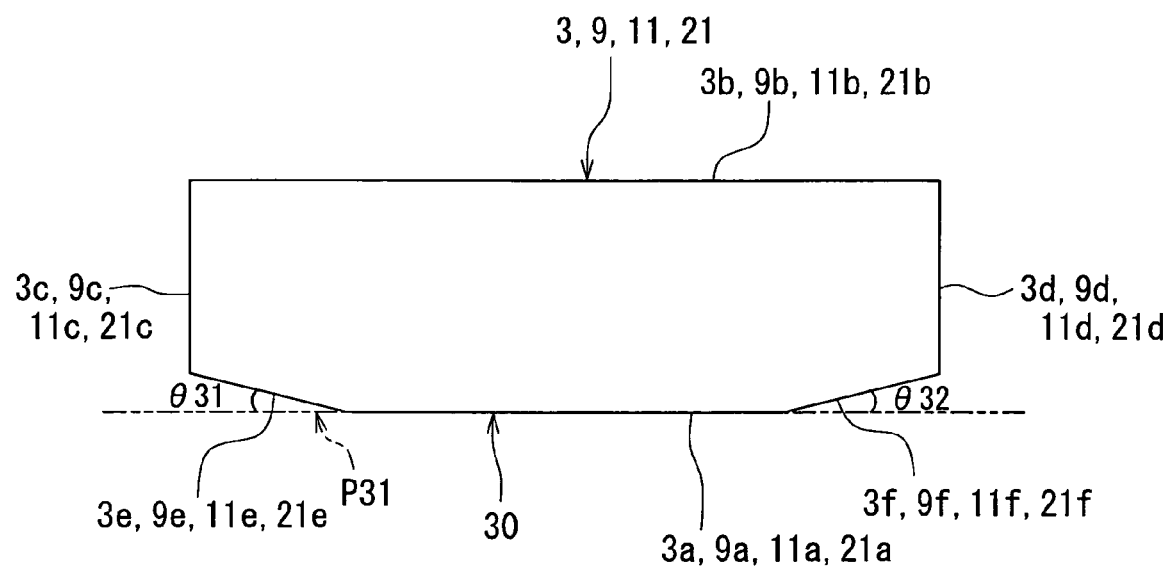
FIG. 16 is a top view for illustrating the plane geometries of the first read shield layer, the second read shield layer, the middle magnetic layer and the write shield layer of a third sample used for a first experiment.

The sample of the third type incorporates the first read shield layer 3, the second read shield layer 9, the middle magnetic layer 11, and the write shield layer 21 that have shapes shown in FIG. 16. FIG. 16 is a top view illustrating the plane geometries of the layers 3, 9, 11 and 21 of the sample of the third type. As shown in FIG. 16, the layers 3, 9, 11 and 21 of the sample of the third type do not incorporate the second width changing portions 3B, 9B, 11B and 21B, the third sloped surfaces 3g, 9g and 11g, and the fourth sloped surfaces 3h, 9h and 11h of the first embodiment. Furthermore, in the layers 3, 9, 11 and 21 of the sample of the third type, the first side surfaces 3c, 9c, 11c and 21c and the second side surfaces 3d, 9d, 11d and 21d are directly connected to both sides of the second end faces 3b, 9b, 11b and 21b, the sides being opposed to each other in the direction of width. In the sample of the third type, the maximum width of the layers 3, 9, 11 and 21 is approximately 90 µm. The width of each of the first end faces 3a, 9a, 11a and 21a is approximately 72 µm. In the sample of the third type, each of the first sloped surfaces 3e, 9e, 11e and 21e forms an angle θ31 with respect to an imaginary plane P31 including the first end faces 3a, 9a, 11a and 21a. In addition, each of the second sloped surfaces 3f, 9f, 11f and 21f forms an angle θ32 with respect to the imaginary plane P31. The other features of the sample of the third type are the same as those of the first type.

For the first experiment each of the angles θ11, θ12, θ13, θ14, θ21, θ22, θ23 and θ24 of the samples of the first and second types, and the angles θ31 and θ32 of the sample of the third type is indicated as an angle θ. The angle θ was designed to fall within a range of 0 to 70 degrees inclusive. The plane geometry of each of the layers 3, 9, 11 and 21 of the sample of the first type when the angle θ is zero and the plane geometry of each of the layers 3, 9, 11 and 21 of the sample of the third type when the angle θ is zero are both rectangles. Furthermore, in the sample of the second type, when the angle θ is zero, an angle of 45 degrees is formed between a plane touching the first side surface that is a curved surface and a plane contiguous to the first side surface at the boundary between the first side surface and the plane contiguous to the first side surface, and is formed between a plane touching the second side surface that is a curved surface and a plane contiguous to the second side surface at the boundary between the second side surface and the plane contiguous to the second side surface.

Figure 17:
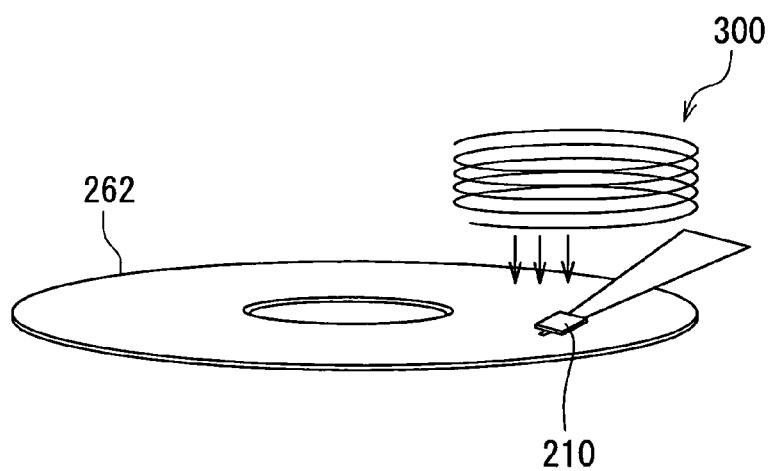
FIG. 17 is a view for illustrating the configuration of an experimental apparatus used for the first experiment.

Reference is now made to FIG. 17 to describe a method of the first experiment. An experimental apparatus shown in FIG. 17 was used for the first experiment. The apparatus had a configuration in which a coil 300 was added to the magnetic disk drive described in the first embodiment. In the apparatus the slider 210 included the samples of the magnetic heads described above. The coil 300 was designed to generate an external magnetic field in the direction orthogonal to the surface of the magnetic disk platter 262 as required.

The first experiment included first to sixth steps that will now be described. In the first step, a signal at a low frequency (1 MHz) was written on a center track of the magnetic disk platter 262 and each of tracks in regions of 50 µm in width on both sides of the center track.

In the second step, the signal at the low frequency was read from each of the tracks on which the signal at the low frequency had been written, and a mean value of read signal outputs obtained was sought for each of the tracks. This value is called an initial signal output.

In the third step, the sample of the magnetic head was placed on the center track, and an external magnetic field was generated from the coil 300 while the magnetic disk platter 262 was rotated. In this case, track erase may occur if magnetic field components in the direction orthogonal to the medium facing surface 30 locally increases in the first end faces 3a, 9a, 11a and 21a, the first sloped surfaces 3e, 9e, 11e and 21e, and the second sloped surfaces 3f, 9f, 11f and 21f. In the fourth step generation of the external field from the coil 300 was stopped.

In the fifth step the signal at the low frequency was read from each of the tracks on which the signal at the low frequency had been written, and a mean value of read signal outputs obtained was sought for each of the tracks. This value is called a residual signal output.

In the sixth step, whether each of the samples was defective or not was judged in terms of track erase. In the step, each of the samples was judged as defective if there was at least one track wherein the proportion of the residual signal output to the initial signal output was 70 percent or lower, and judged as non-defective if there was no track wherein the proportion of the residual signal output to the initial signal output was 70 percent or lower.

Figure 18:
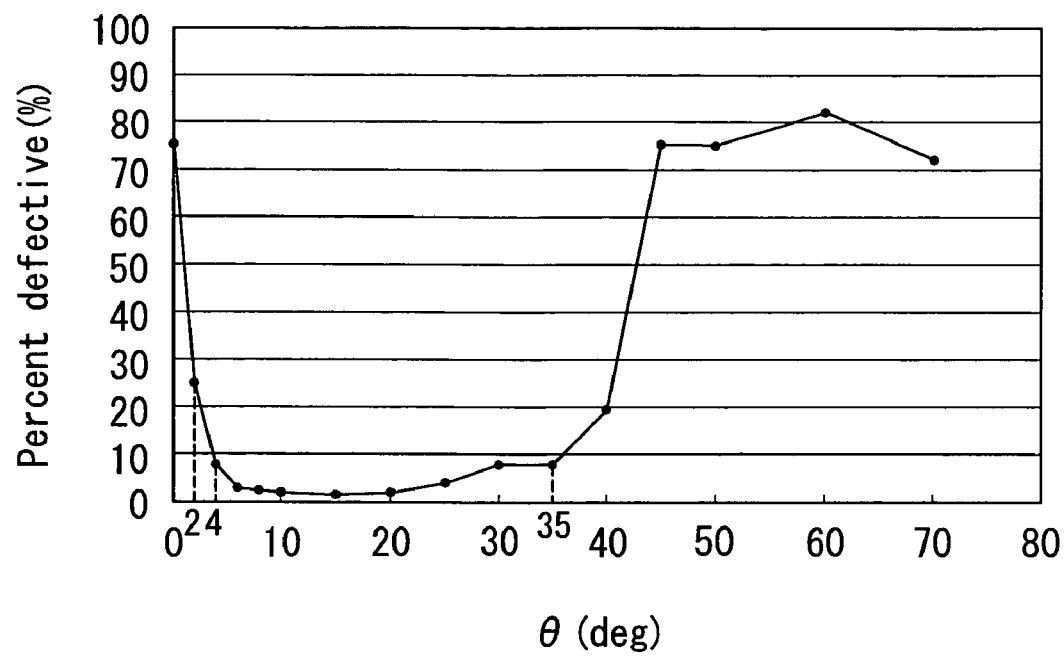
FIG. 18 is a plot showing the relationship between an angle θ and a percent defective of samples of a first type obtained in the first experiment.
Figure 19:
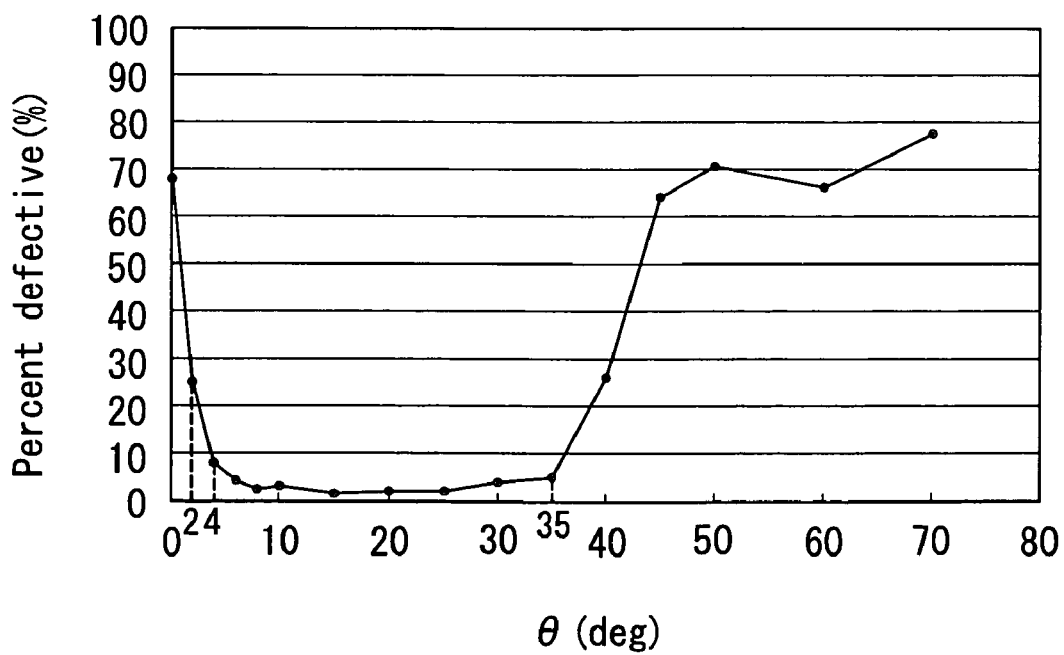
FIG. 19 is a plot showing the relationship between the angle θ and a percent defective of samples of a second type obtained in the first experiment.
Figure 20:
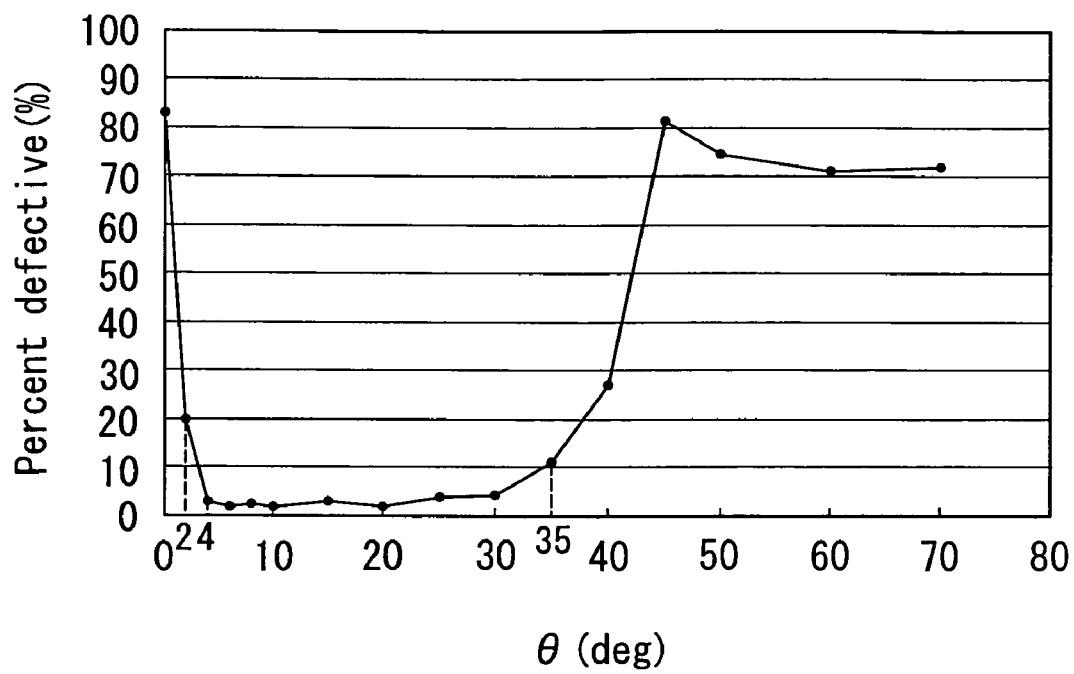
FIG. 20 is a plot showing the relationship between the angle θ and a percent defective of samples of a third type obtained in the first experiment.

The foregoing experiment was performed on a number of samples, and the ratio of samples judged as defective among a plurality of samples under the same condition was determined. The value expressing this ratio in percent is a percent defective. The result of the first experiment is shown in FIG. 18 to FIG. 20. FIG. 18 is a plot showing the relationship between the angle θ and the percent defective of the samples of the first type. FIG. 19 is a plot showing the relationship between the angle θ and the percent defective of the samples of the second type. FIG. 20 is a plot showing the relationship between the angle θ and the percent defective of the samples of the third type.

As shown in FIG. 18 to FIG. 20, there are similar tendencies among the samples of the first to third types. That is, for the samples of each of the types, an effect of suppressing track erase is obtained where the angle θ falls within a range of 2 to 40 degrees inclusive. For the samples of each of the types, this effect is noticeable where the angle θ falls within a range of 4 to 35 degrees inclusive. This indicates that it is important for suppressing an occurrence of track erase that the layers 3, 9, 11 and 21 have the first width changing portions 3A, 9A, 11A and 21A. In addition, as the result of the first experiment indicates, for suppressing an occurrence of track erase, the angle θ should preferably fall within a range of 2 to 40 degrees inclusive, and more preferably within a range of 4 to 35 degrees inclusive in the first and second embodiments.

For each of the samples of the first to third types, the percent defective increases when the angle θ is greater than 40 degrees. It is assumed that the reason is that, when the angle θ is greater than 40 degrees, the magnetic field components in the direction orthogonal to the medium facing surface 30 increase in a neighborhood of corners formed between the respective first end faces 3a, 9a, 11a and 21a and the respective first sloped surfaces 3e, 9e, 11e and 21e, and in a neighborhood of corners formed between the respective first end faces 3a, 9a, 11a and 21a and the respective second sloped surfaces 3f, 9f, 11f and 21f.

[Second Experiment]

The second experiment relates to output variations of the read head resulting from the magnetizing the bias field applying layers 6. In the second experiment, samples of magnetic heads of first to third types the same as those of the first experiment were used. However, the angle θ was 10 degrees in the second experiment. The other features of the samples of the first to third types were the same as those of the first experiment.

A method of the second experiment will now be described. The second experiment was performed through the use of the magnetic disk drive described in the first embodiment. The second experiment included first to twelfth steps described below. In the first step the bias field applying layers 6 were magnetized. This is called initial magnetizing.

In the second step a signal at a low frequency (1 MHz) was written on a specific track of the magnetic disk platter 262, and the signal was read. A mean value of read signal outputs obtained was sought. This value is called an initial signal output.

In the third step the bias field applying layers 6 were magnetized again. This is called first re-magnetizing. In the fourth step a signal at a low frequency was written on a specific track of the magnetic disk platter 262, and the signal was read. A mean value of read signal outputs obtained was sought. This value is called a signal output after the first re-magnetizing.

In the fifth step the bias field applying layers 6 were magnetized again. This is called second re-magnetizing. In the sixth step a signal at a low frequency was written on a specific track of the magnetic disk platter 262, and the signal was read. A mean value of read signal outputs obtained was sought. This value is called a signal output after the second re-magnetizing.

In the seventh step the bias field applying layers 6 were magnetized again. This is called third re-magnetizing. In the eighth step a signal at a low frequency was written on a specific track of the magnetic disk platter 262, and the signal was read. A mean value of read signal outputs obtained was sought. This value is called a signal output after the third re-magnetizing.

In the ninth step the bias field applying layers 6 were magnetized again. This is called fourth re-magnetizing. In the tenth step a signal at a low frequency was written on a specific track of the magnetic disk platter 262, and the signal was read. A mean value of read signal outputs obtained was sought. This value is called a signal output after the fourth re-magnetizing.

In the eleventh step the bias field applying layers 6 were magnetized again. This is called fifth re-magnetizing. In the twelfth step a signal at a low frequency was written on a specific track of the magnetic disk platter 262, and the signal was read. A mean value of read signal outputs obtained was sought. This value is called a signal output after the fifth re-magnetizing.

In each of the fourth, sixth, eighth, tenth and twelfth steps, the sample was judged as defective if the signal output after re-magnetizing had changed from the initial signal output by 20 percent or greater of the initial signal output, and the sample was judged as non-defective if the result was contrary.

Figure 21:
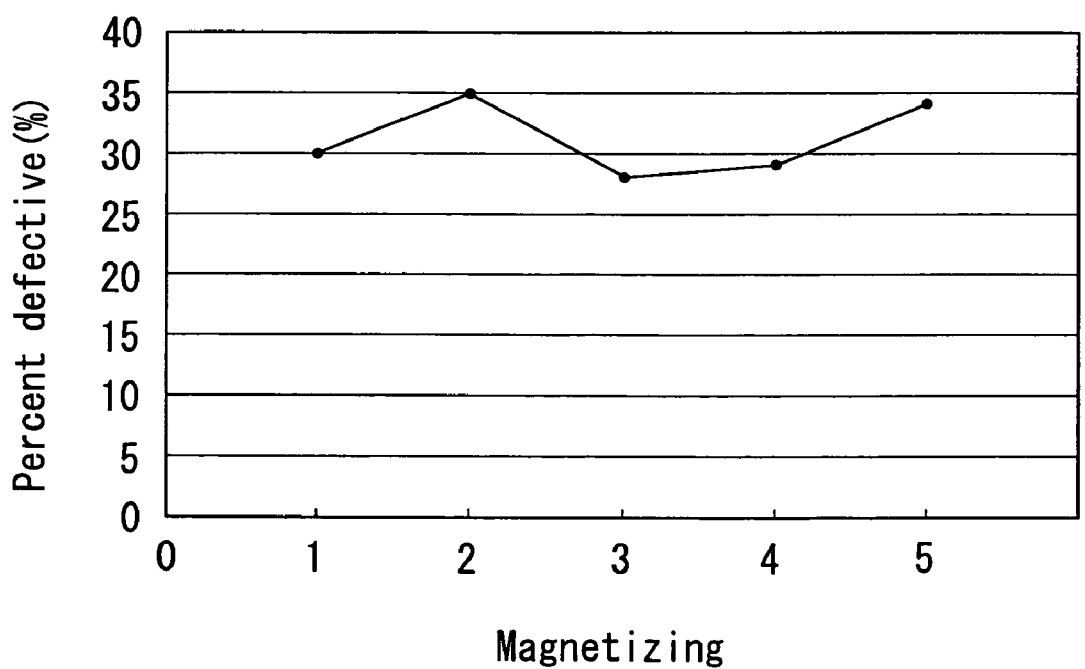
FIG. 21 is a plot showing the percent defective of the samples of the third type for every re-magnetizing obtained in a second experiment.
Figure 22:
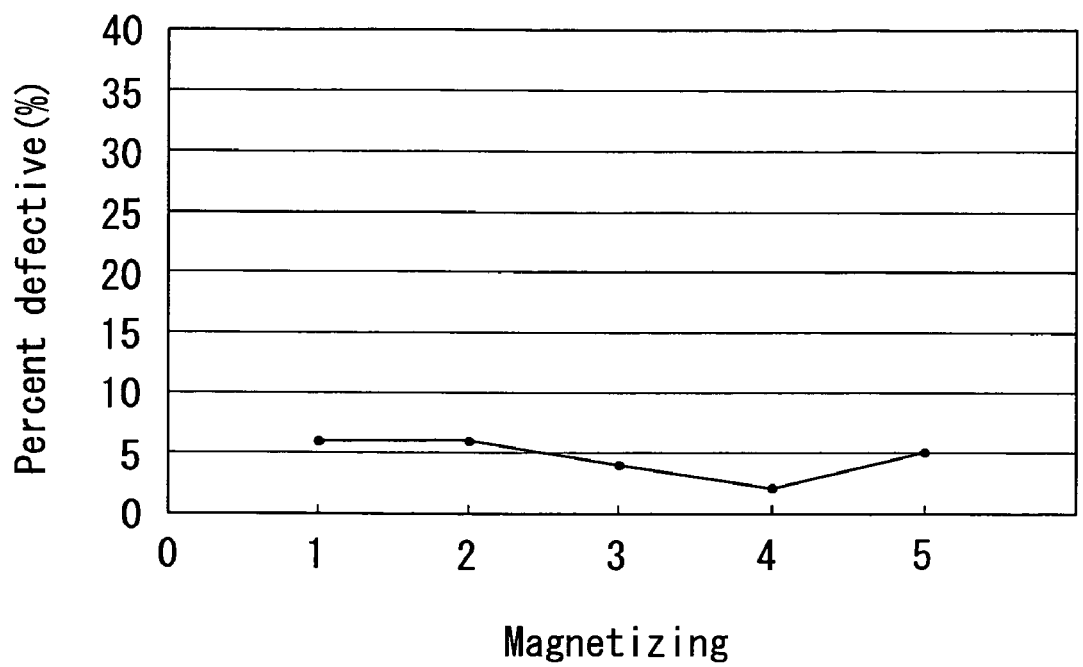
FIG. 22 is a plot showing the percent defective of the samples of the first type for every re-magnetizing obtained in the second experiment.
Figure 23:
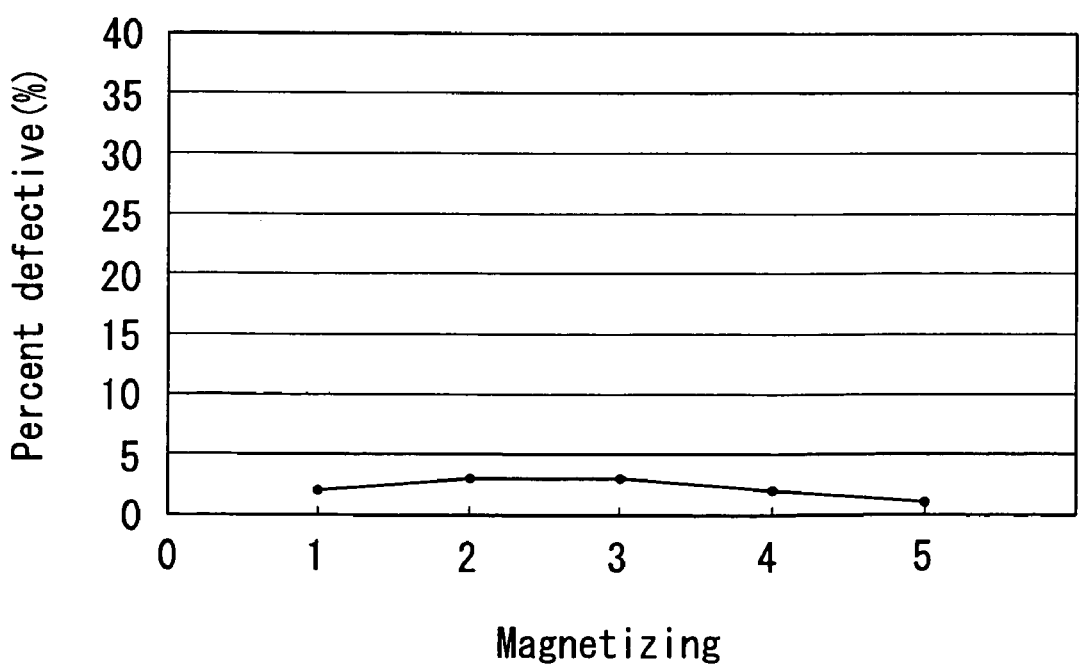
FIG. 23 is a plot showing the percent defective of the samples of the second type for every re-magnetizing obtained in the second experiment.

The foregoing experiment was performed on a number of samples, and the ratio of samples judged as defective among a plurality of samples under the same condition was determined. The value expressing this ratio in percent is a percent defective. The result of the second experiment is shown in FIG. 21 to FIG. 23. FIG. 21 is a plot showing the percent defective of the samples of the third type for each re-magnetizing. FIG. 22 is a plot showing the percent defective of the samples of the first type for each re-magnetizing. FIG. 23 is a plot showing the percent defective of the samples of the second type for each re-magnetizing. In FIG. 21 to FIG. 23, numerals 0 to 5 on the horizontal axis indicate the initial magnetizing, the first re-magnetizing, the second re-magnetizing, the third re-magnetizing, the fourth re-magnetizing, and the fifth re-magnetizing, respectively.

As shown in FIG. 21, the percent defective of the samples of the third type for each re-magnetizing is high. In contrast, as shown in FIG. 22 and FIG. 23, the percent defective of the samples of the first and second types for each re-magnetizing is very low. If comparison is made between FIG. 22 and FIG. 23, it is noted that the percent defective of the samples of the second type for each re-magnetizing is lower than that of the samples of the first type.

Consideration will now be given to the reason why the percent defective of the samples of the third type for each re-magnetizing is high whereas the percent defective of the samples of the first and second types for each re-magnetizing is low. FIG. 24A to FIG. 24F schematically illustrate an example of magnetic domain structures of the read shield layers 3 and 9 of the samples of the third type. FIG. 24A to FIG. 24F respectively show the domain structures of the read shield layers 3 and 9 after the initial magnetizing, those after the first re-magnetizing, those after the second re-magnetizing, those after the third re-magnetizing, those after the fourth re-magnetizing, and those after the fifth re-magnetizing. Arrows in these drawings indicate the directions of magnetization. It is easy to observe domain structures as shown in FIG. 24A to FIG. 24F through the use of a domain observing apparatus.

As shown in FIG. 24A to FIG. 24F, the domain structures of the read shield layers 3 and 9 of the samples of the third type change after every magnetizing. It is considered that this results from the fact that the plane geometry of each of the read shield layers 3 and 9 is such one that two portions of the plane geometry divided by an imaginary center line parallel to the medium facing surface 30 are not line-symmetric with respect to the center line. If the domain structures of the read shield layers 3 and 9 change after every magnetizing as shown in FIG. 24A to FIG. 24F, the directions of magnetization of the read shield layers 3 and 9 near the medium facing surface 30 can change after every magnetizing.

Figure 24A:
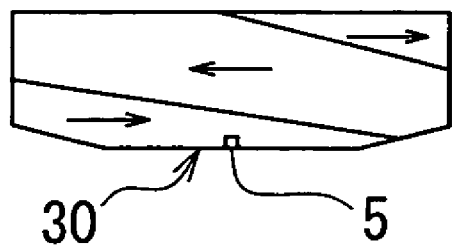
FIG. 24A to FIG. 24F each schematically illustrate an example of magnetic domain structures of the first and second read shield layers of a sample of the third type used in a third experiment.
Figure 24B:
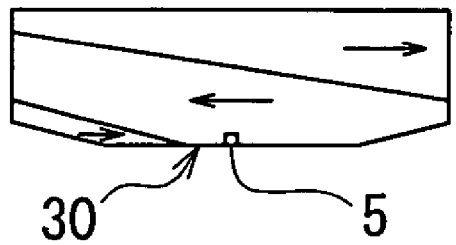
Figure 24C:
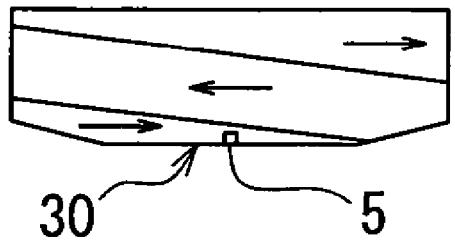
Figure 24D:
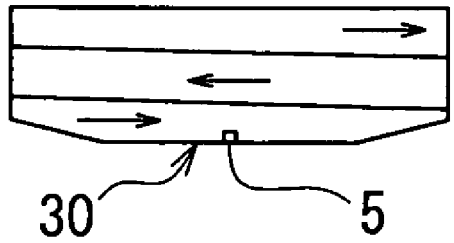
Figure 24E:
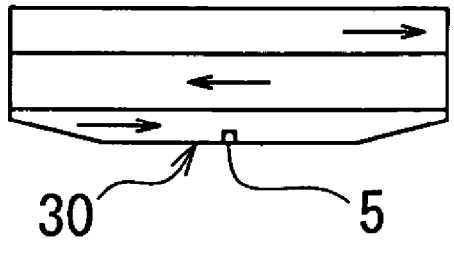
Figure 24F:
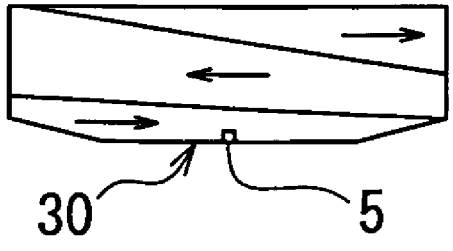
Figure 25:
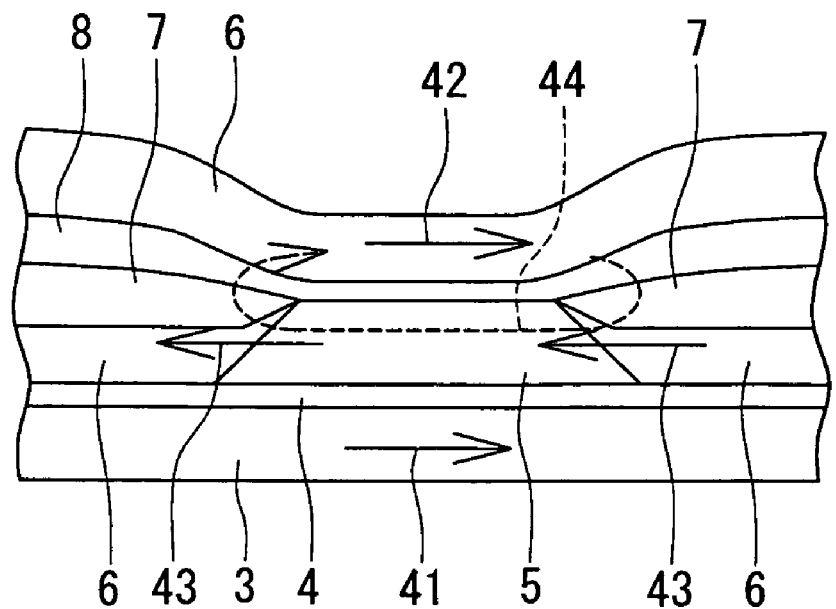
FIG. 25 is a view for illustrating the state of the read head in a neighborhood of the medium facing surface when the first and second read shield layers have the domain structures as illustrated in FIG. 24A.
Figure 26:
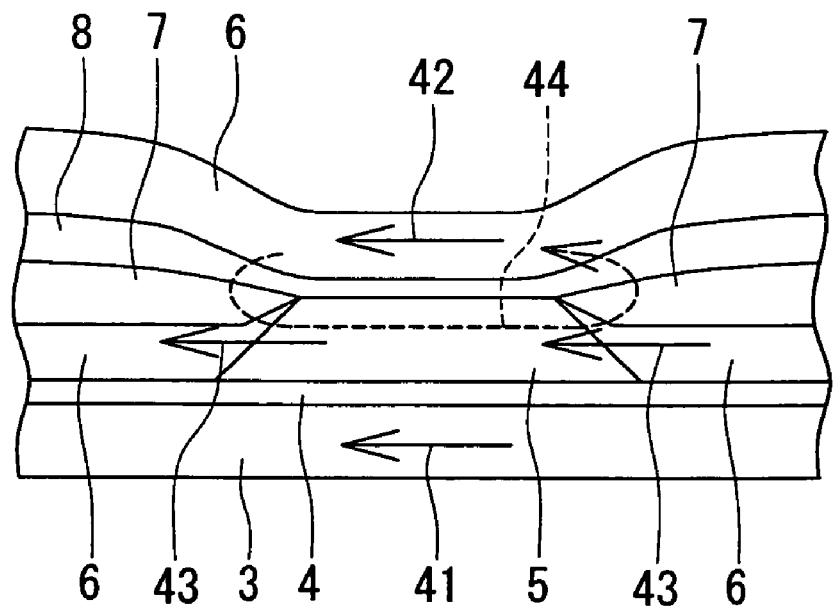
FIG. 26 is a view for illustrating the state of the read head in a neighborhood of the medium facing surface when the first and second read shield layers have the domain structures as illustrated in FIG. 24B.

FIG. 25 is a view for illustrating the state of the read head near the medium facing surface 30 when the read shield layers 3 and 9 have the domain structures shown in FIG. 24A. FIG. 26 is a view for illustrating the state of the read head near the medium facing surface 30 when the read shield layers 3 and 9 have the domain structures shown in FIG. 24B. In FIG. 25 and FIG. 26 the arrow with numeral 41 indicates the direction of magnetization of the read shield layer 3, the arrow with numeral 42 indicates the direction of magnetization of the read shield layer 9, and the arrows with numeral 43 indicate the direction of bias magnetic field created by the bias field applying layers 6. In FIG. 25 and FIG. 26, the arrow with numeral 44 indicates the direction of a magnetic field applied to the MR element 5 by the magnetization of the read shield layers 3 and 9. The states illustrated in FIG. 25 and FIG. 26 being compared, the directions of the magnetic fields applied to the MR element 5 by the magnetization of the read shield layers 3 and 9 are opposite.

As shown in FIG. 25 and FIG. 26, the bias magnetic field and the magnetic field generated by the magnetization of the read shield layers 3 and 9 are applied to the MR element 5. As a result, if the direction of magnetization of the read shield layers 3 and 9 change and the direction of the magnetic field applied to the MR element 5 by the magnetization of the read shield layers 3 and 9 is thereby changed, the output of the read head changes.

Figure 27:
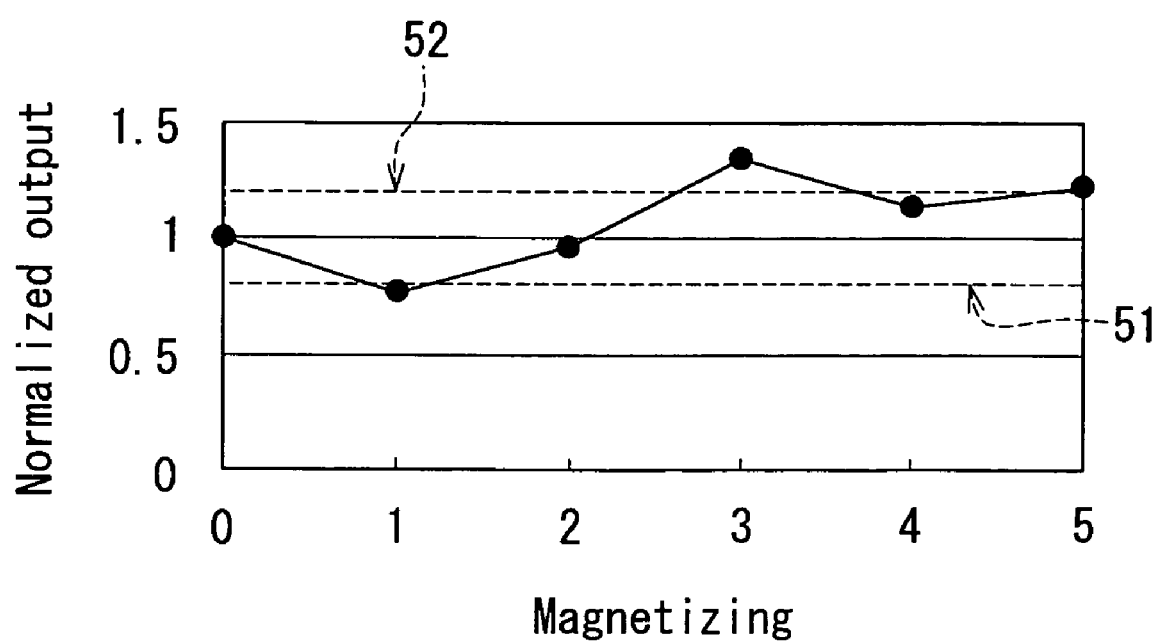
FIG. 27 is a plot showing an example of change in output of the read head obtained for every magnetizing of the sample of the third type used in the second experiment.
Figure 28A:
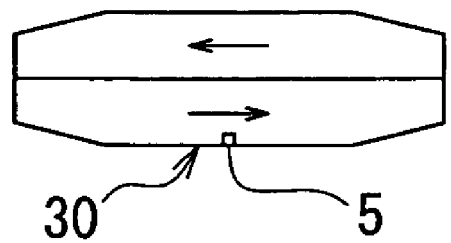
FIG. 28A to FIG. 28F each schematically illustrate an example of magnetic domain structures of the first and second read shield layers of the sample of the first type used in the second experiment.
Figure 28B:
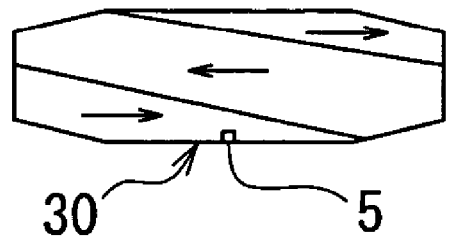
Figure 28C:
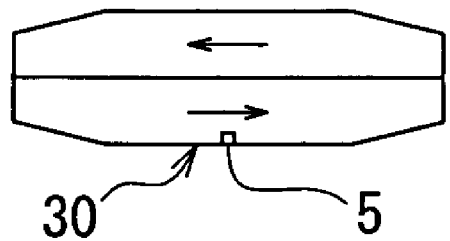
Figure 28D:
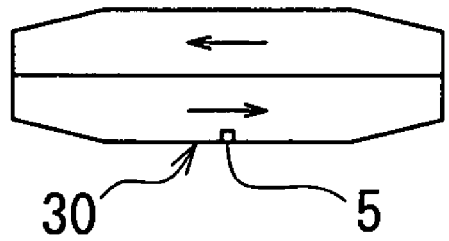
Figure 28E:
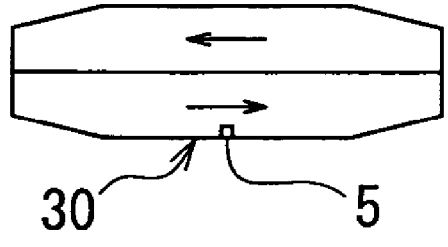
Figure 28F:
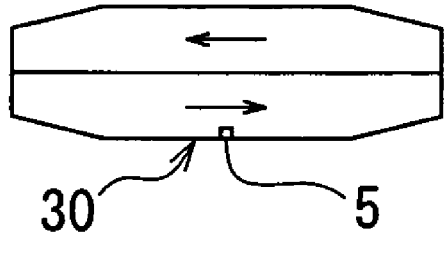
Figure 29A:
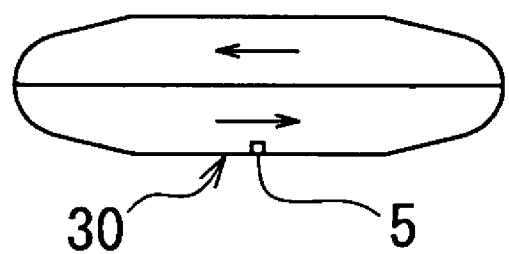
FIG. 29A to FIG. 29F each schematically illustrate an example of magnetic domain structures of the first and second read shield layers of the sample of the second type used in the second experiment.
Figure 29B:
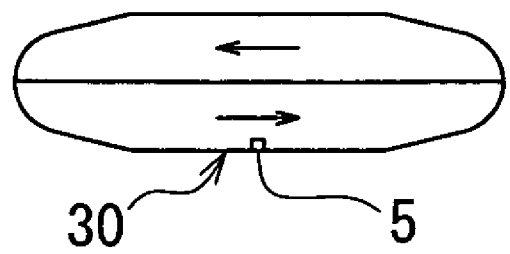
Figure 29C:
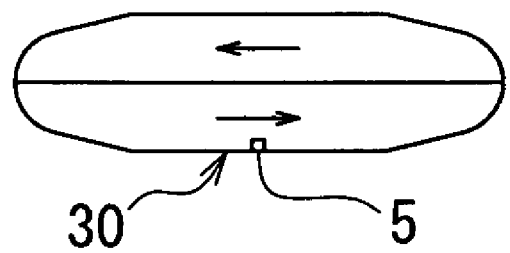
Figure 29D:
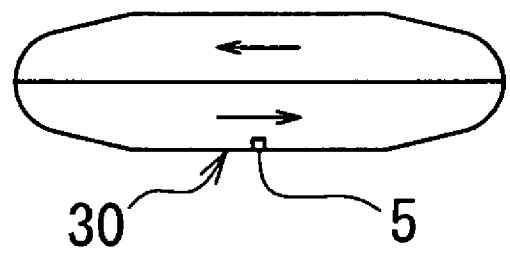
Figure 29E:
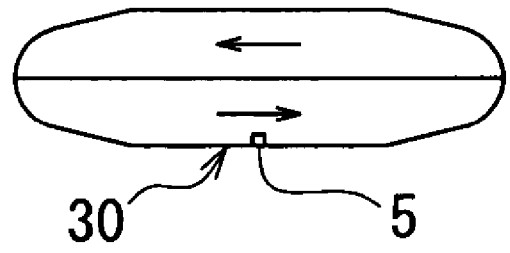
Figure 29F:
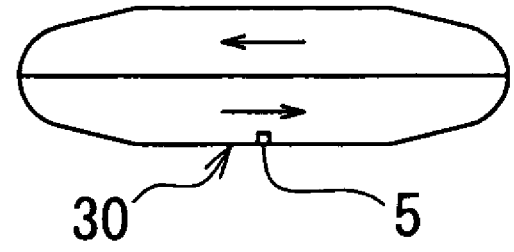

FIG. 27 is a plot showing an example of change in output of the read head of the samples of the third type for each magnetizing. In FIG. 27, numerals 0 to 5 on the horizontal axis indicate the initial magnetizing, the first re-magnetizing, the second re-magnetizing, the third re-magnetizing, the fourth re-magnetizing, and the fifth re-magnetizing, respectively. In FIG. 27 the vertical axis indicates a normalized output. Here, the normalized output means a value obtained by dividing the signal output after each magnetizing by the initial signal output. In FIG. 27 the broken line with numeral 51 indicates the level of 80 percent of the initial signal output, and the broken line with numeral 52 indicates the level of 120 percent of the initial signal output. In the example shown in FIG. 27, the signal outputs after the first, third and fifth re-magnetizing each change from the initial signal output by 20 percent or more of the initial signal output.

The foregoing discussion suggests that the percent defective of the samples of the third type for each re-magnetizing is high because the domain structures of the read shield layers 3 and 9 easily change after magnetizing.

FIG. 28A to FIG. 28F schematically illustrate an example of domain structures of the read shield layers 3 and 9 of the samples of the first type. FIG. 29A to FIG. 29F schematically illustrate an example of domain structures of the read shield layers 3 and 9 of the samples of the second type. FIG. 28A to FIG. 28F and FIG. 29A to FIG. 29F show the domain structures of the read shield layers 3 and 9 after the initial magnetizing, those after the first re-magnetizing, those after the second re-magnetizing, those after the third re-magnetizing, those after the fourth re-magnetizing, and those after the fifth re-magnetizing, respectively. Arrows in these drawings indicate the directions of magnetization. In the example of the samples of the first type shown in FIG. 28A to FIG. 28F, the domain structures of the read shield layers 3 and 9 after every magnetizing remain the same except the domain structures after the first re-magnetizing shown in FIG. 28B. In the example of the samples of the second type shown in FIG. 29A to FIG. 29F, the domain structures of the read shield layers 3 and 9 after every magnetizing remain the same. Therefore, in the examples shown in FIG. 28A to FIG. 28F and FIG. 29A to FIG. 29F, a change in the domain structures of the read shield layers 3 and 9 after magnetizing is more greatly suppressed for the samples of the second type, compared with the samples of the first type.

In the samples of the first and second types, the plane geometry of each of the read shield layers 3 and 9 is such one that two portions of the plane geometry divided by an imaginary center line parallel to the medium facing surface 30 are line-symmetric with respect to the center line. It is therefore assumed that the domain structures of the read shield layers 3 and 9 of the samples of the first and second types after magnetizing tend to remain the same. As a result, it is assumed that in the samples of the first and second types a change in the domain structures of the read shield layers 3 and 9 after magnetizing is suppressed, and the percent defective for every re-magnetizing is thereby reduced. Furthermore, it is assumed that the domain structures of the read shield layers 3 and 9 of the samples of the second type after magnetizing is likely to be more stable than those of the samples of the first type and that the percent defective of the samples of the second type for every re-magnetizing is therefore lower than that of the samples of the first type.

The result of the second experiment and the foregoing discussion indicate that, to suppress output variations of the read head resulting from the magnetizing of the bias field applying layers 6, it is important that the read shield layers 3 and 9 have not only the first width changing portions 3A and 9A but also the second width changing portions 3B and 9B as in the first and second embodiments of the invention. Furthermore, the result of the second experiment teaches that the effect of suppressing output variations of the read head resulting from the magnetizing of the bias field applying layers 6 is greater in the second embodiment than in the first embodiment.

[Third Experiment]

The third experiment relates to output variations of the read head resulting from the magnetizing of the bias field applying layers 6, as the second experiment does. In the third experiment, samples of magnetic heads of first to third types the same as those of the first experiment were used. The angle θ was designed to fall within a range of 0 to 45 degrees inclusive in the third experiment. The other features of the samples of the first to third types are the same as those of the first experiment. The plane geometry of each of the layers 3, 9, 11 and 21 of the sample of the first type when the angle θ is zero and the plane geometry of each of the layers 3, 9, 11 and 21 of the sample of the third type when the angle θ is zero are both rectangles.

Figure 30:
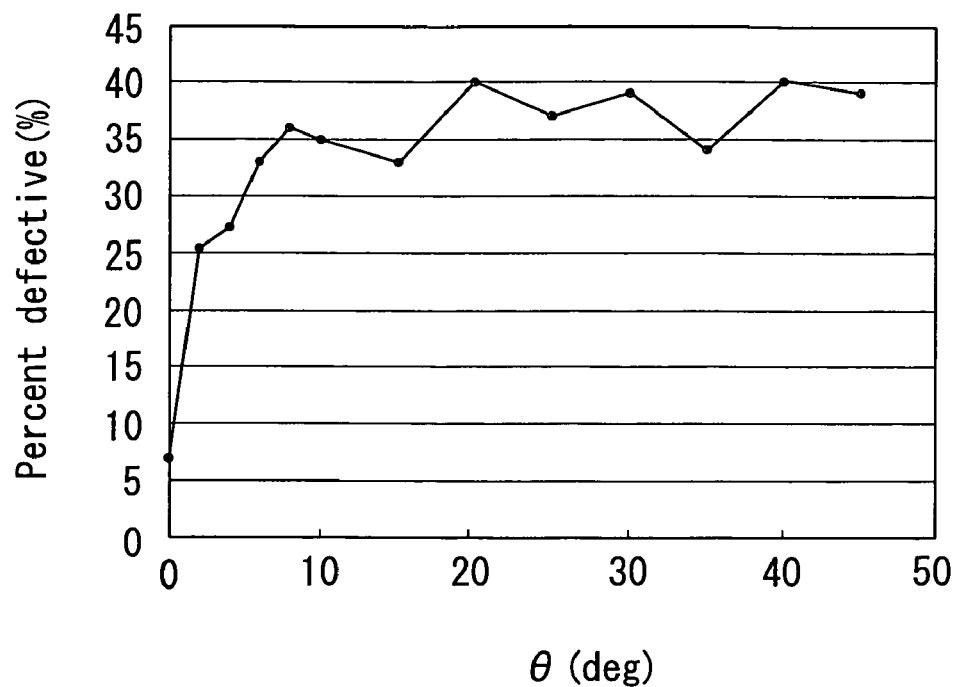
FIG. 30 is a plot showing the relationship between the angle θ and a percent defective of the samples of the third type obtained in the third experiment.
Figure 31:
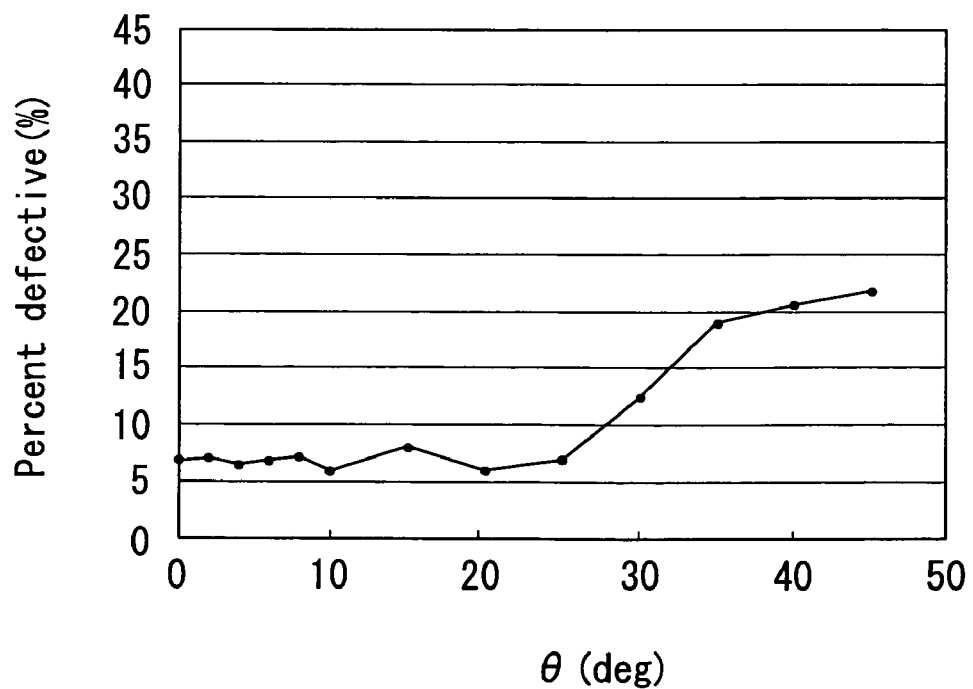
FIG. 31 is a plot showing the relationship between the angle θ and a percent defective of the samples of the first type obtained in the third experiment.
Figure 32:
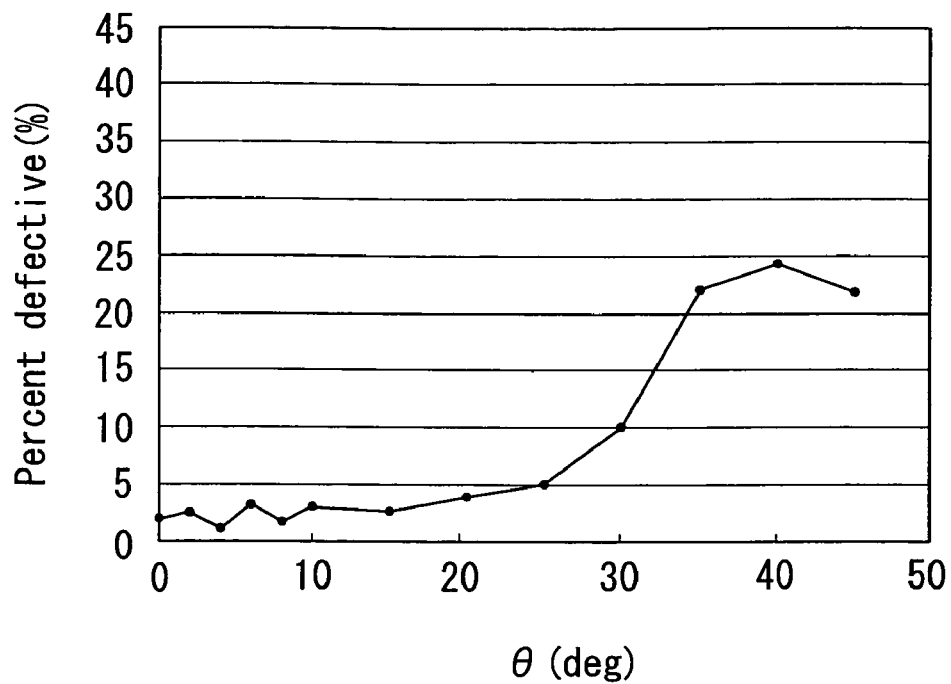
FIG. 32 is a plot showing the relationship between the angle θ and a percent defective of the samples of the second type obtained in the third experiment.

In the third experiment first to twelfth steps the same as those of the second experiment were performed. In the third experiment, among a plurality of samples under the same condition, the ratio of samples judged as defective once or more after the first to fifth re-magnetizing was determined, and the value expressing this ratio in percent is defined as a percent defective. The result of the third experiment is shown in FIG. 30 to FIG. 32. FIG. 30 is a plot showing the relationship between the angle θ and the percent defective of the samples of the third type. FIG. 31 is a plot showing the relationship between the angle θ and the percent defective of the samples of the first type. FIG. 32 is a plot showing the relationship between the angle θ and the percent defective of the samples of the second type.

As shown in FIG. 30, the percent defective of the samples of the third type greatly increases when the angle θ is 2 degrees or greater. As shown in FIG. 31 and FIG. 32, the percent defective of the samples of each of the first and second types is sufficiently low when the angle θ falls within a range of 0 to 30 degrees inclusive, and the percent defective is very low in particular when the angle θ falls within a range of 0 to 25 degrees inclusive. Therefore, to suppress output variations of the read head resulting from the magnetizing of the bias field applying layers 6, the angle θ should preferably fall within a range of 0 to 30 degrees inclusive, and more preferably within a range of 0 to 25 degrees inclusive.

The result of the first experiment teaches that, to suppress an occurrence of track erase, each of the angles θ11, θ12, θ21 and θ22 should preferably fall within a range of 2 to 40 degrees inclusive, and more preferably within a range of 4 to 35 degrees inclusive in the first and second embodiments. Considering both of the result of the first experiment and the result of the third experiment, to suppress an occurrence of track erase and output variations of the read head resulting from the magnetizing of the bias field applying layers 6, each of the angles θ11, θ12, θ21 and θ22 of the read shield layers 3 and 9 should preferably fall within a range of 2 to 30 degrees inclusive, and more preferably within a range of 4 to 25 degrees inclusive in the first and second embodiments. Since the middle magnetic layer 11 has a function of a read shield layer, it is preferred that the middle shield layer 11 have a shape the same as that of each of the read shield layers 3 and 9 to suppress an occurrence of track erase and output variations of the read head resulting from the magnetizing of the bias field applying layers 6.

The shape of the write shield layer 21 does not influence output variations of the read head resulting from the magnetizing of the bias field applying layers 6. However, the result of the fourth experiment that will be described below suggests that it is preferred that the write shield layer 21 have a shape the same as that of each of the read shield layers 3 and 9.

[Fourth Experiment]

The fourth experiment relates to wide-range adjacent track erase. In the fourth experiment, samples of magnetic heads of an example of the embodiment of the invention and samples of reference magnetic heads were used. The samples of the example correspond to the first embodiment. The samples of the example of the embodiment are the samples of the first type of the first experiment in which each of the angles θ11, θ12, θ13 and θ14 of the read shield layers 3 and 9 and the middle magnetic layer 11 (See FIG. 4) and each of the angles θ21, θ22, θ23 and θ24 of the write shield layer 21 (See FIG.

5) is 10 degrees. The samples of the reference magnetic heads differ from the samples of the example of the embodiment in the shape of the write shield layer 21 only. The write shield layer 21 of the samples of the reference magnetic heads has a shape the same as the write shield layer 21 (See FIG. 16) of the sample of the third type of the first experiment, wherein each of the angles θ31 and θ32 is 10 degrees.

In the fourth experiment, first, a signal at a low frequency (1 MHz) was written on a center track of the magnetic disk platter 262 and each of tracks in regions of 50 µm in width on both sides of the center track. Next, the signal at the low frequency was read from each of the tracks on which the signals at the low frequency had been written, and a mean value of read signal outputs obtained was sought for each of the tracks. This value is called an initial signal output. Next, a signal at a high frequency (160 MHz) was written on the center track. Next, the signal at the low frequency that had been written first was read from each of the tracks on which the signals at the low frequency had been written except the center track, and a mean value of read signal outputs obtained was sought for each of the tracks. This value is called a residual signal output. The ratio of the residual signal output to the initial signal output was defined as a normalized output. If the wide-range adjacent track erase occurs, the normalized output greatly decreases on one or more tracks.

Figure 33:
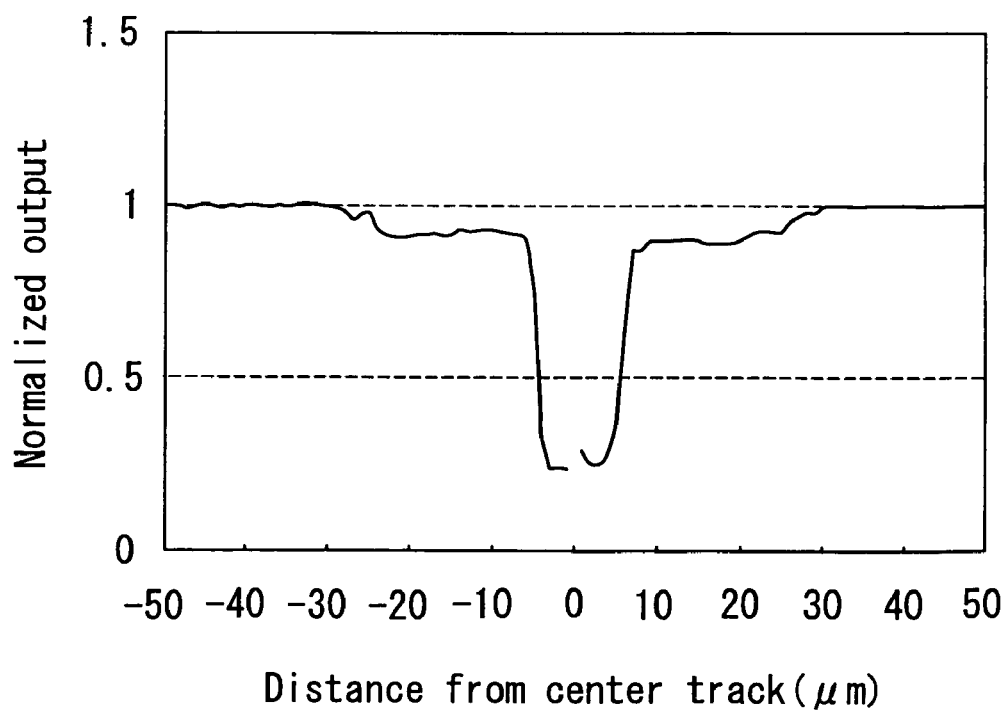
FIG. 33 is a plot showing the relationship between the normalized output and the distance from the center track of a sample of a reference magnetic head obtained in a fourth experiment.
Figure 34:
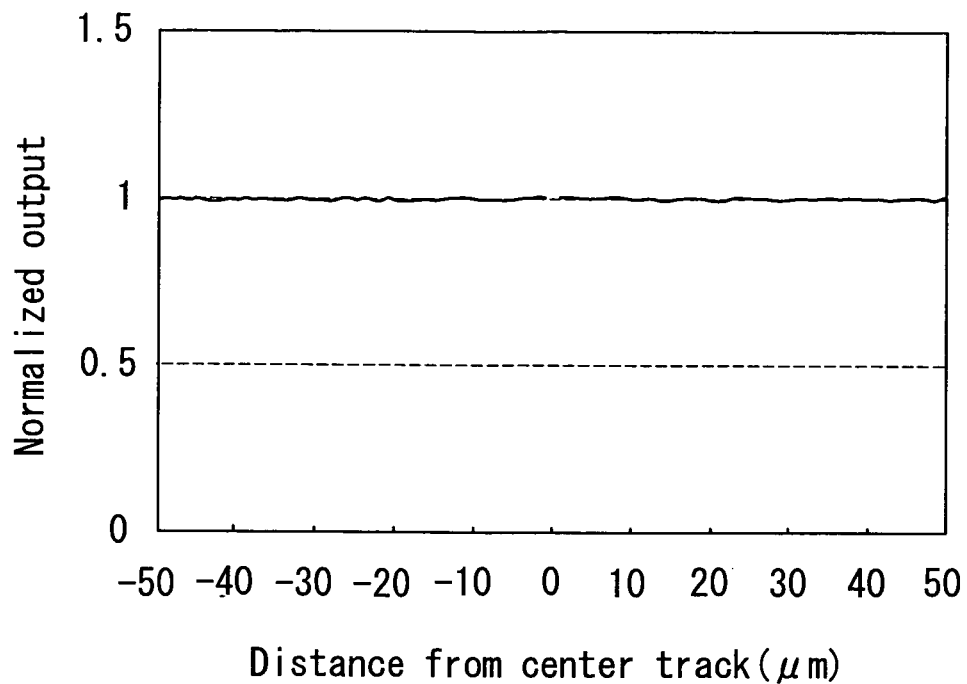
FIG. 34 is a plot showing the relationship between the normalized output and the distance from the center track of a sample of an example of the embodiment of the invention obtained in a fourth experiment.

The result of the fourth experiment is shown in FIG. 33 and FIG. 34. FIG. 33 is a plot showing the relationship between the normalized output and the distance from the center track of the samples of the reference magnetic head. FIG. 34 is a plot showing the relationship between the normalized output and the distance from the center track of the samples of the example of the embodiment. As shown in FIG. 33 and FIG. 34, no wide-range adjacent track erase occurred in the samples of the example of the embodiment while the wide-range adjacent track erase occurred in the samples of the reference magnetic head.

It is assumed that the reason why the wide-range adjacent track erase occurred in the samples of the reference magnetic head is that the plane geometry of the write shield layer 21 of the reference magnetic head is such one that two portions of the plane geometry divided by an imaginary center line parallel to the medium facing surface 30 are not line-symmetric with respect to the center line. That is, it is assumed that, the magnetic state of the write shield layer 21 of the reference magnetic head tends to be unstable, like the read shield layers 3 and 9 of FIG. 24A to FIG. 24F, and the magnetic flux passing through the first end face 21a is thereby changed to cause the wide-range adjacent track erase.

On the other hand, the plane geometry of the write shield layer 21 of the example of the embodiment is such one that two portions of the plane geometry divided by an imaginary center line parallel to the medium facing surface 30 are line-symmetric with respect to the center line. That is, it is assumed that, the magnetic state of the write shield layer 21 of the example of the embodiment tends to be stable, and an occurrence of wide-range adjacent track erase is thereby suppressed.

The fourth experiment teaches that it is preferred that the write shield layer 21 have a shape the same as that of each of the read shield layers 3 and 9 to achieve suppression of wide-range adjacent track erase in addition to suppression of track erase and output variations of the read head resulting from the magnetizing of the bias field applying layers 6.

[Fifth Experiment]

The fifth experiment was performed to determine a preferable range of parameter P indicating a deviation from the symmetry described in the first and second embodiments. Samples of magnetic heads of fourth and fifth types that will now be described were used in the fifth experiment.

The samples of the fourth type correspond to the first embodiment. The samples of the fourth type include the sample of the first type of the second experiment. This sample of the first type is called a fundamental sample of the fourth type. The value of the parameter P is zero for the fundamental sample. The samples of the fourth type include the fundamental sample and samples similar to the fundamental sample. The samples similar to the fundamental sample are those in which the parameter P is changed within a range of 0.02 to 0.40 inclusive by making each of the angles θ11, θ12, θ21 and θ22 10 degrees and making each of the angles θ13, θ14, θ23 and θ24 other than 10 degrees or by making each of the angles θ11, θ12, θ13, θ14, θ21, θ22, θ23 and θ24 10 degrees and making the respective lengths of the third sloped surfaces 3g, 9g, 11g and 21g and the fourth sloped surfaces 3h, 9h, 11h and 21h different from the respective lengths of the first sloped surfaces 3e, 9e, 11e and 21e and the fourth sloped surfaces 3f, 9f, 11f and 21f.

The samples of the fifth type correspond to the second embodiment. The samples of the fifth type include the sample of the second type of the second experiment. This sample of the second type is called a fundamental sample of the fifth type. The value of the parameter P is zero for the fundamental sample. The samples of the fifth type include the fundamental sample and samples similar to the fundamental sample. The samples similar to the fundamental sample are those in which the parameter P is changed within a range of 0.02 to 0.40 inclusive by making each of the angles θ11, θ12, θ21 and θ22 10 degrees and making each of the angles θ13, θ14, θ23 and θ24 other than 10 degrees or by making each of the angles θ11, θ12, θ13, θ14, θ21, θ22, θ23 and θ24 10 degrees and making the respective lengths of the third sloped surfaces 3g, 9g, 11g and 21g and the fourth sloped surfaces 3h, 9h, 11h and 21h different from the respective lengths of the first sloped surfaces 3e, 9e, 11e and 21e and the fourth sloped surfaces 3f, 9f, 11f and 21f.

In the fifth experiment, first to twelfth steps the same as those of the second experiment were performed for each of the samples. In the fifth experiment, in a plurality of samples under the same condition, a signal output whose amount of change with respect to the initial signal output was greatest was determined among signal outputs after the first to fifth re-magnetizing, and the proportion of samples wherein the amount of change of the signal output determined above was equal to or greater than 20 percent of the initial signal output was determined. This proportion expressed in percent was defined as a percent defective.

Figure 35:
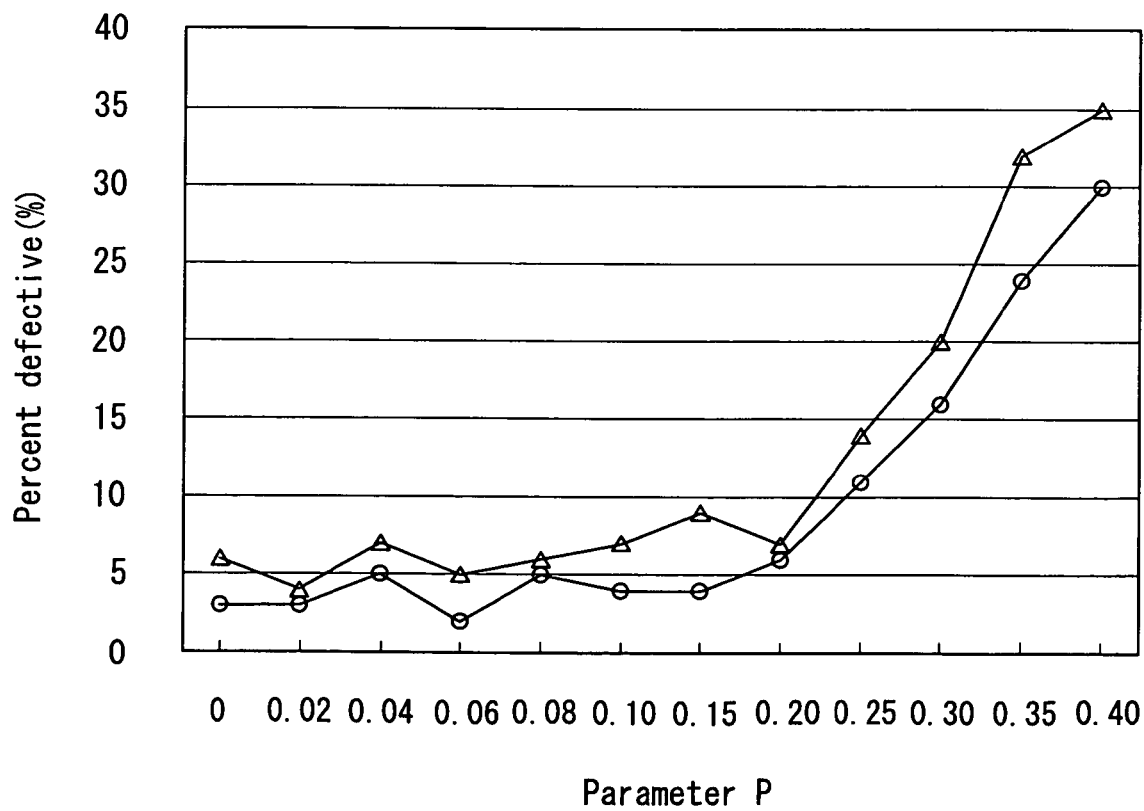
FIG. 35 is a plot showing the relationship between a parameter P and a percent defective of each of samples of fourth and fifth types obtained in a fifth experiment.

The result of the fifth experiment is shown in FIG. 35. FIG. 35 is a plot showing the relationship between the parameter P and the percent defective of the samples of the fourth and fifth types. In FIG. 35 a plurality of deltas and the straight lines connecting the deltas indicate the characteristic of the samples of the fourth type. In FIG. 35 a plurality of dots and the straight lines connecting the dots indicate the characteristic of the samples of the fifth type.

As shown in FIG. 35, for each of the sample of the fourth and fifth types, the percent defective is of a small value that is less than 10 percent as long as the parameter P falls within a range of 0 to 0.2 inclusive. However, the percent defective increases if the parameter P is greater than 0.2 for each of the samples of the fourth and fifth types. Based on this result of the fifth experiment, the range of the parameter P is defined as 0 to 0.2 inclusive in the first and second embodiments.

The present invention is not limited to the foregoing embodiments but may be practiced in still other ways. For example, the shape of each of the layers 3, 9, 11 and 21 is not limited to the ones disclosed in the first and second embodiments. For example, curved surfaces may be provided in place of the first to fourth sloped surfaces in the first and second embodiments. In this case, it is preferred that an angle that falls within a range of 2 to 30 degrees inclusive be formed between the first end face and the plane touching the curved surface contiguous to the first end face at the boundary between the first end face and the curved surface and between the second end face and the plane touching the curved surface contiguous to the second end face at the boundary between the second end face and the curved surface. It is more preferred that this angle fall within a range of 4 to 25 degrees inclusive.

While the thin-film magnetic head disclosed in the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;
   a first read shield layer disposed to face toward the first surface of the magnetoresistive element;
   a second read shield layer disposed to face toward the second surface of the magnetoresistive element; and
   bias field applying layers for applying a bias magnetic field to the magnetoresistive element, wherein:
   each of the first and second read shield layers has: a first end face located in the medium facing surface; a second end face opposite to the first end face; a first width changing portion that continuously decreases in width as a distance from the first end face decreases; and a second width changing portion that continuously decreases in width as a distance from the second end face decreases;
   each of the first and second read shield layers has such a plane geometry that four corners of a circumscribed rectangle that circumscribes the plane geometry are cut off; and
   assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

2. The thin-film magnetic head according to claim 1, wherein the plane geometry of each of the first and second read shield layers is such one that two portions of the plane geometry divided by the imaginary center line are line-symmetric with respect to the center line.

3. The thin-film magnetic head according to claim 1, wherein: the first width changing portion has a first sloped surface and a second sloped surface that are connected to respective ends of the first end face, the ends being opposed to each other in a direction of width; and the second width changing portion has a third sloped surface and a fourth sloped surface that are connected to respective ends of the second end face, the ends being opposed to each other in the direction of width.

4. The thin-film magnetic head according to claim 3, wherein: each of the first and second read shield layers further has a first side surface connecting the first sloped surface to the third sloped surface, and a second side surface connecting the second sloped surface to the fourth sloped surface; and each of the first and second side surfaces is a flat surface.

5. The thin-film magnetic head according to claim 3, wherein: each of the first and second read shield layers further has a first side surface connecting the first sloped surface to the third sloped surface, and a second side surface connecting the second sloped surface to the fourth sloped surface; and each of the first and second side surfaces is a curved surface protruding outward along the direction of width.

6. The thin-film magnetic head according to claim 3, wherein an angle that falls within a range of 2 to 30 degrees inclusive is respectively formed between the first sloped surface and a first imaginary plane including the first end face, between the second sloped surface and the first imaginary plane, between the third sloped surface and a second imaginary plane including the second end face, and between the fourth sloped surface and the second imaginary plane.

7. The thin-film magnetic head according to claim 1, wherein the plane geometry of the first read shield layer and that of the second read shield layer are identical.

8. A thin-film magnetic head comprising:
   a medium facing surface that faces toward a recording medium;
   a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;
   a first read shield layer disposed to face toward the first surface of the magnetoresistive element;
   a second read shield layer disposed to face toward the second surface of the magnetoresistive element;
   bias field applying layers for applying a bias magnetic field to the magnetoresistive element;
   a coil for generating a magnetic field corresponding to data to be written on the recording medium; and
   a pole layer having an end face located in the medium facing surface, allowing a magnetic flux corresponding to the field generated by the coil to pass therethrough, and generating a write magnetic field for writing the data on the recording medium by means of the perpendicular magnetic recording system;
   a write shield layer having a first end face located in the medium facing surface and having a portion located away from the medium facing surface and coupled to the pole layer; and
   a gap layer provided between the pole layer and the write shield layer and having an end face located in the medium facing surface, wherein:
   in the medium facing surface, the first end face of the write shield layer is located forward of the end face of the pole layer along a direction of travel of the recording medium with a specific space created by a thickness of the gap layer;

the first end face of the write shield layer is greater in width than the end face of the pole layer;

each of the first read shield layer and the second read shield layer has: a first end face located in the medium facing surface; a second end face opposite to the first end face; a first width changing portion that continuously decreases in width as a distance from the first end face decreases; and a second width changing portion that continuously decreases in width as a distance from the second end face decreases;

the write shield layer further has: a second end face opposite to the first end face; a first width changing portion that continuously decreases in width as a distance from the first end face decreases; and a second width changing portion that continuously decreases in width as a distance from the second end face decreases;

each of the first read shield layer, the second read shield layer and the write shield layer has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

9. The thin-film magnetic head according to claim 8, wherein the plane geometry of each of the first read shield layer, the second read shield layer and the write shield layer is such one that two portions of the plane geometry divided by the imaginary center line are line-symmetric with respect to the center line.

10. The thin-film magnetic head according to claim 8, wherein: the first width changing portion has a first sloped surface and a second sloped surface that are connected to respective ends of the first end face, the ends being opposed to each other in a direction of width; and the second width changing portion has a third sloped surface and a fourth sloped surface that are connected to respective ends of the second end face, the ends being opposed to each other in the direction of width.

11. The thin-film magnetic head according to claim 10, wherein: each of the first read shield layer, the second read shield layer and the write shield layer further has a first side surface connecting the first sloped surface to the third sloped surface, and a second side surface connecting the second sloped surface to the fourth sloped surface; and each of the first and second side surfaces is a flat surface.

12. The thin-film magnetic head according to claim 10, wherein: each of the first read shield layer, the second read shield layer and the write shield layer further has a first side surface connecting the first sloped surface to the third sloped surface, and a second side surface connecting the second sloped surface to the fourth sloped surface; and each of the first and second side surfaces is a curved surface protruding outward along the direction of width.

13. The thin-film magnetic head according to claim 10, wherein an angle that falls within a range of 2 to 30 degrees inclusive is respectively formed between the first sloped surface and a first imaginary plane including the first end face, between the second sloped surface and the first imaginary plane, between the third sloped surface and a second imaginary plane including the second end face, and between the fourth sloped surface and the second imaginary plane.

14. The thin-film magnetic head according to claim 8, wherein the plane geometry of the first read shield layer, that of the second read shield layer, and that of the write shield layer are identical.

15. A head gimbal assembly comprising: a slider including a thin-film magnetic head and disposed to face toward a recording medium; and a suspension flexibly supporting the slider, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element; and bias field applying layers for applying a bias magnetic field to the magnetoresistive element, wherein:

each of the first and second read shield layers has: a first end face located in the medium facing surface; a second end face opposite to the first end face; a first width changing portion that continuously decreases in width as a distance from the first end face decreases; and a second width changing portion that continuously decreases in width as a distance from the second end face decreases;

each of the first and second read shield layers has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

16. A head gimbal assembly comprising: a slider including a thin-film magnetic head and disposed to face toward a recording medium; and a suspension flexibly supporting the slider, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element;

bias field applying layers for applying a bias magnetic field to the magnetoresistive element;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of the perpendicular magnetic recording system;

a write shield layer having a first end face located in the medium facing surface and having a portion located away from the medium facing surface and coupled to the pole layer; and a gap layer provided between the pole layer and the write shield layer and having an end face located in the medium facing surface, wherein:

in the medium facing surface, the first end face of the write shield layer is located forward of the end face of the pole layer along a direction of travel of the recording medium with a specific space created by a thickness of the gap layer;

the first end face of the write shield layer is greater in width than the end face of the pole layer;

each of the first read shield layer and the second read shield layer has: a first end face located in the medium facing surface; a second end face opposite to the first end face; a first width changing portion that continuously decreases in width as a distance from the first end face decreases; and a second width changing portion that continuously decreases in width as a distance from the second end face decreases;

the write shield layer further has: a second end face opposite to the first end face; a first width changing portion that continuously decreases in width as a distance from the first end face decreases; and a second width changing portion that continuously decreases in width as a distance from the second end face decreases;

each of the first read shield layer, the second read shield layer and the write shield layer has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

17. A head arm assembly comprising: a slider including a thin-film magnetic head and disposed to face toward a recording medium; a suspension flexibly supporting the slider; and an arm for making the slider travel across tracks of the recording medium, the suspension being attached to the arm, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element; and bias field applying layers for applying a bias magnetic field to the magnetoresistive element, wherein:

each of the first and second read shield layers has: a first end face located in the medium facing surface; a second end face opposite to the first end face; a first width changing portion that continuously decreases in width as a distance from the first end face decreases; and a second width changing portion that continuously decreases in width as a distance from the second end face decreases;

each of the first and second read shield layers has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

18. A head arm assembly comprising: a slider including a thin-film magnetic head and disposed to face toward a recording medium; a suspension flexibly supporting the slider; and an arm for making the slider travel across tracks of the recording medium, the suspension being attached to the arm, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element;

bias field applying layers for applying a bias magnetic field to the magnetoresistive element;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of the perpendicular magnetic recording system;

a write shield layer having a first end face located in the medium facing surface and having a portion located away from the medium facing surface and coupled to the pole layer; and a gap layer provided between the pole layer and the write shield layer and having an end face located in the medium facing surface, wherein:

in the medium facing surface, the first end face of the write shield layer is located forward of the end face of the pole layer along a direction of travel of the recording medium with a specific space created by a thickness of the gap layer;

the first end face of the write shield layer is greater in width than the end face of the pole layer;

each of the first read shield layer and the second read shield layer has: a first end face located in the medium facing surface; a second end face opposite to the first end face; a first width changing portion that continuously decreases in width as a distance from the first end face decreases; and a second width changing portion that continuously decreases in width as a distance from the second end face decreases;

the write shield layer further has: a second end face opposite to the first end face; a first width changing portion that continuously decreases in width as a distance from the first end face decreases; and a second width changing portion that continuously decreases in width as a distance from the second end face decreases;

each of the first read shield layer, the second read shield layer and the write shield layer has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

19. A magnetic disk drive comprising: a slider including a thin-film magnetic head and disposed to face toward a circular-plate-shaped recording medium that is driven to rotate; and an alignment device supporting the slider and aligning the slider with respect to the recording medium, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element; and bias field applying layers for applying a bias magnetic field to the magnetoresistive element, wherein:

each of the first and second read shield layers has: a first end face located in the medium facing surface; a second end face opposite to the first end face; a first width changing portion that continuously decreases in width as a distance from the first end face decreases; and a second width changing portion that continuously decreases in width as a distance from the second end face decreases;

each of the first and second read shield layers has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

20. A magnetic disk drive comprising: a slider including a thin-film magnetic head and disposed to face toward a circular-plate-shaped recording medium that is driven to rotate; and an alignment device supporting the slider and aligning the slider with respect to the recording medium, the thin-film magnetic head comprising:

a medium facing surface that faces toward the recording medium;

a magnetoresistive element disposed near the medium facing surface and having a first surface and a second surface that face toward opposite directions and that intersect the medium facing surface, the magnetoresistive element reading data stored on the recording medium by means of a perpendicular magnetic recording system;

a first read shield layer disposed to face toward the first surface of the magnetoresistive element;

a second read shield layer disposed to face toward the second surface of the magnetoresistive element;

bias field applying layers for applying a bias magnetic field to the magnetoresistive element;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of the perpendicular magnetic recording system;

a write shield layer having a first end face located in the medium facing surface and having a portion located away from the medium facing surface and coupled to the pole layer; and a gap layer provided between the pole layer and the write shield layer and having an end face located in the medium facing surface, wherein:

in the medium facing surface, the first end face of the write shield layer is located forward of the end face of the pole layer along a direction of travel of the recording medium with a specific space created by a thickness of the gap layer;

the first end face of the write shield layer is greater in width than the end face of the pole layer;

each of the first read shield layer and the second read shield layer has: a first end face located in the medium facing surface; a second end face opposite to the first end face; a first width changing portion that continuously decreases in width as a distance from the first end face decreases; and a second width changing portion that continuously decreases in width as a distance from the second end face decreases;

the write shield layer further has: a second end face opposite to the first end face; a first width changing portion that continuously decreases in width as a distance from the first end face decreases; and a second width changing portion that continuously decreases in width as a distance from the second end face decreases;

each of the first read shield layer, the second read shield layer and the write shield layer has such a plane geometry that four corners of a circumscribed rectangle that circumscribes the plane geometry are cut off; and assuming that, among four pieces separated from the circumscribed rectangle to form the plane geometry, two of the pieces closer to the first end face are defined as first pieces while the other two of the pieces closer to the second end face are defined as second pieces, and that the plane geometry and the circumscribed rectangle are folded along an imaginary center line parallel to the medium facing surface, a value obtained by dividing an area of portions of the first and second pieces that are not laid over each other by a sum of areas of the first and second pieces falls within a range of 0 to 0.2 inclusive.

* * * * *